United States Patent [19]
Rosbury et al.

[11] 4,385,384
[45] May 24, 1983

[54] MODEM DIAGNOSTIC AND CONTROL SYSTEM

[75] Inventors: Arthur H. Rosbury, Plantation, Fla.; Judson T. Gilbert, Newtown, Conn.; Donald C. O'Connor, Miami; Grant A. Newland, Miami Lakes, both of Fla.

[73] Assignee: Racal Data Communications Inc., Miami, Fla.

[21] Appl. No.: 265,175

[22] Filed: May 19, 1981

Related U.S. Application Data

[63] Continuation of Ser. No. 49,338, Jun. 18, 1979, abandoned, which is a continuation of Ser. No. 803,945, Jun. 6, 1977, abandoned.

[51] Int. Cl.³ .................. G06F 11/00; H04M 3/08
[52] U.S. Cl. ........................ 371/22; 179/2 DP; 179/175.3 R; 371/8; 371/15; 375/10
[58] Field of Search ............ 371/8, 15, 20, 22; 370/13, 16; 375/10; 364/200, 900; 340/506, 508, 514, 516; 179/1 C, 2 R, 2 A, 2 DP, 175.3 R, 175.35

[56] References Cited

U.S. PATENT DOCUMENTS

| Re. 30,037 | 6/1979 | Bass | 371/22 |
| 3,349,374 | 10/1967 | Gabrielson et al. | 375/7 |
| 3,715,723 | 2/1973 | Fletcher et al. | 371/69 |
| 3,806,878 | 4/1974 | Edstrom | 364/200 |
| 3,819,878 | 6/1974 | Pine et al. | 179/175.3 R |
| 3,838,260 | 9/1974 | Nelson | 371/16 |
| 3,943,305 | 3/1976 | Hagedorn | 179/175.3 R |
| 4,006,461 | 2/1977 | Coulter et al. | 340/163 |
| 4,039,751 | 8/1977 | Couturier et al. | 179/175.3 R |
| 4,055,808 | 10/1977 | Holsinger et al. | 375/10 |
| 4,076,961 | 2/1978 | Holsinger et al. | 179/2 DP |
| 4,076,970 | 2/1978 | Lubarsky, Jr. et al. | 364/200 |
| 4,112,264 | 9/1978 | Abramson et al. | 179/175.3 R |

OTHER PUBLICATIONS

Forney, Jr. et al., Multipoint Networks: Advances in Modem Design and Control, 1976 National Telecommunications Conference, Nov.-Dec., 1976, pp. 50.1-1 to 50.1-4.

Primary Examiner—Charles E. Atkinson
Attorney, Agent, or Firm—Jackson, Jones & Price

[57] ABSTRACT

A system for diagnosing and controlling operation of a plurality of modems, some located at a central site and others at various remote sites. A processor located at the central site selectively addresses microprocessor test and control units at each modem over a secondary channel. The microprocessor test and control units respond to commands to configure and perform various modem tests, operate autonomously to monitor various alarm conditions, and format status reports and alarm maydays for transmission back to the central processor. The system is capable of performing a wide variety of testing, monitoring and network control functions for a very large network of modems.

74 Claims, 22 Drawing Figures

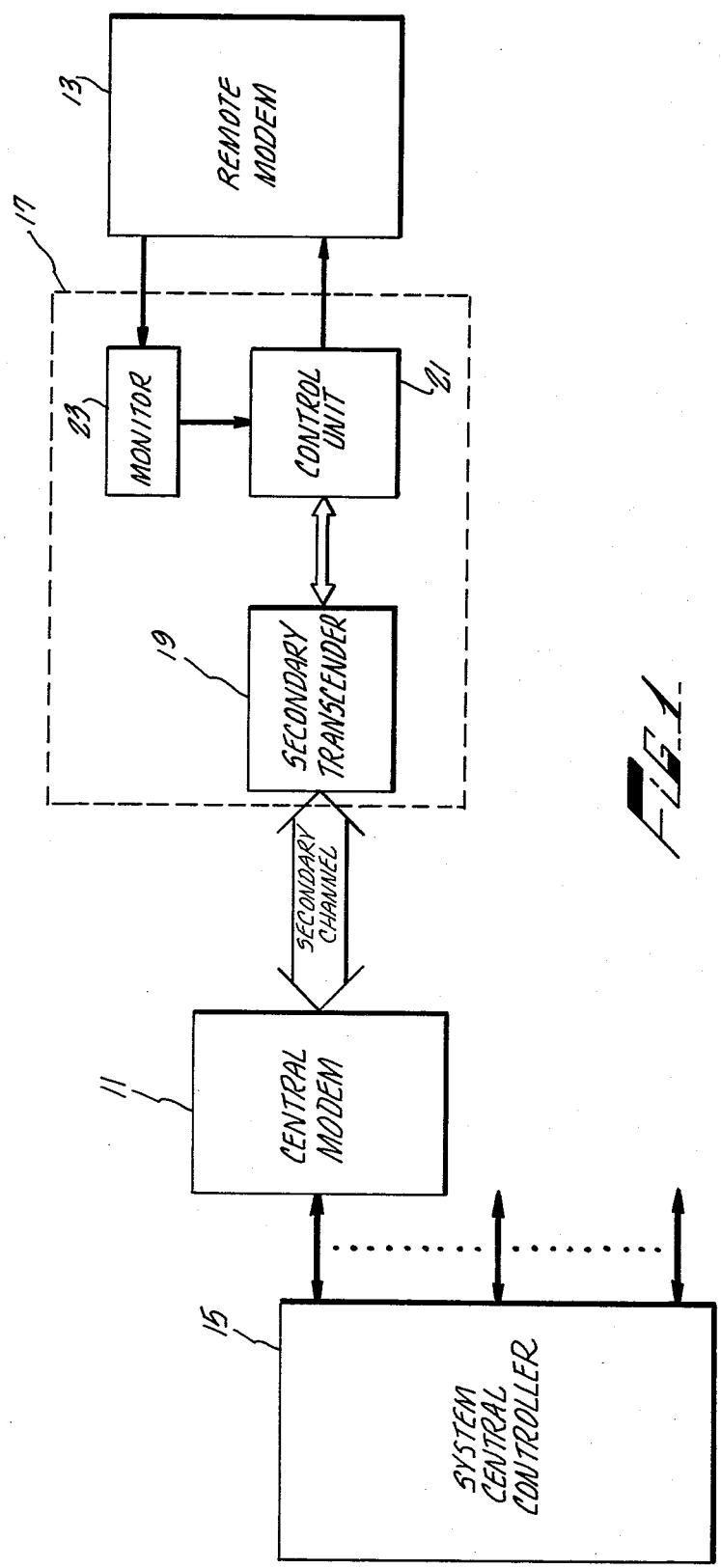

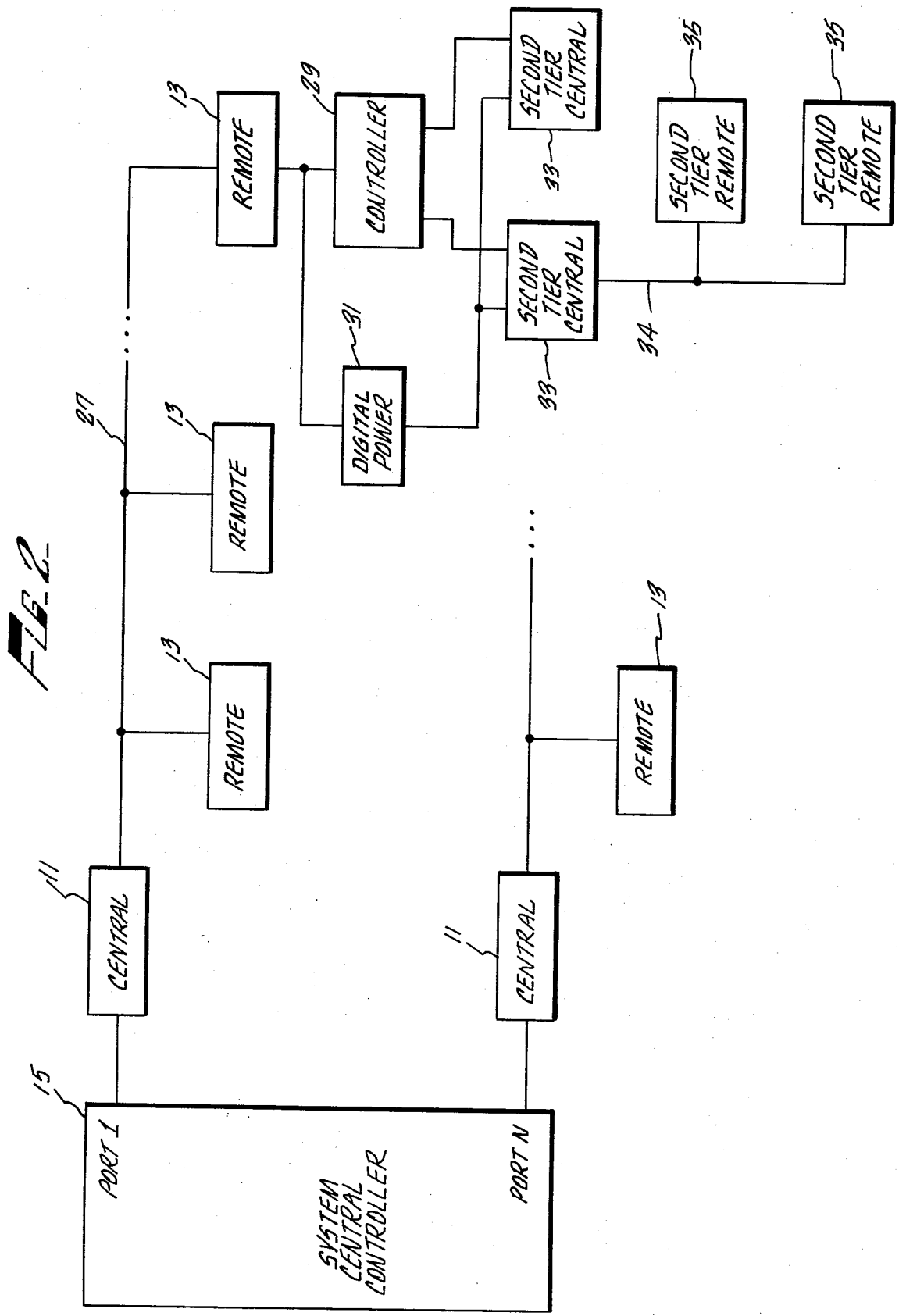

| START BIT | DEL CHARACTER | EVEN PARITY | STOP BIT | STOP BIT |
|---|---|---|---|---|

| START BIT | DEL CHARACTER | EVEN PARITY | STOP BIT | STOP BIT |
|---|---|---|---|---|

FIRST BIT IN TIME

| START BIT | $A_0$ | $A_1$ | $A_2$ | $A_3$ | $T_0$ | 0 | 0 | EVEN PARITY | STOP BIT | STOP BIT |
|---|---|---|---|---|---|---|---|---|---|---|

| START BIT | $A_4$ | $A_5$ | $A_6$ | $A_7$ | 0 | 0 | 0 | EVEN PARITY | STOP BIT | STOP BIT |
|---|---|---|---|---|---|---|---|---|---|---|

| START BIT | 7 COMMAND BITS | EVEN PARITY | STOP BIT | STOP BIT |
|---|---|---|---|---|

| START BITS | BLOCK CHECK | PARITY CHARACTER | EVEN PARITY | STOP BIT | STOP BIT |
|---|---|---|---|---|---|

*FIG. 3*

| MODE IN ANALOG LOOP | OR | DIGITAL LOOP | DIAL MODE | DTE POWER | SIGNAL QUALITY | DSR | DCD/RTS | R/C OR RTS/DCD |
|---|---|---|---|---|---|---|---|---|

*FIG. 4*

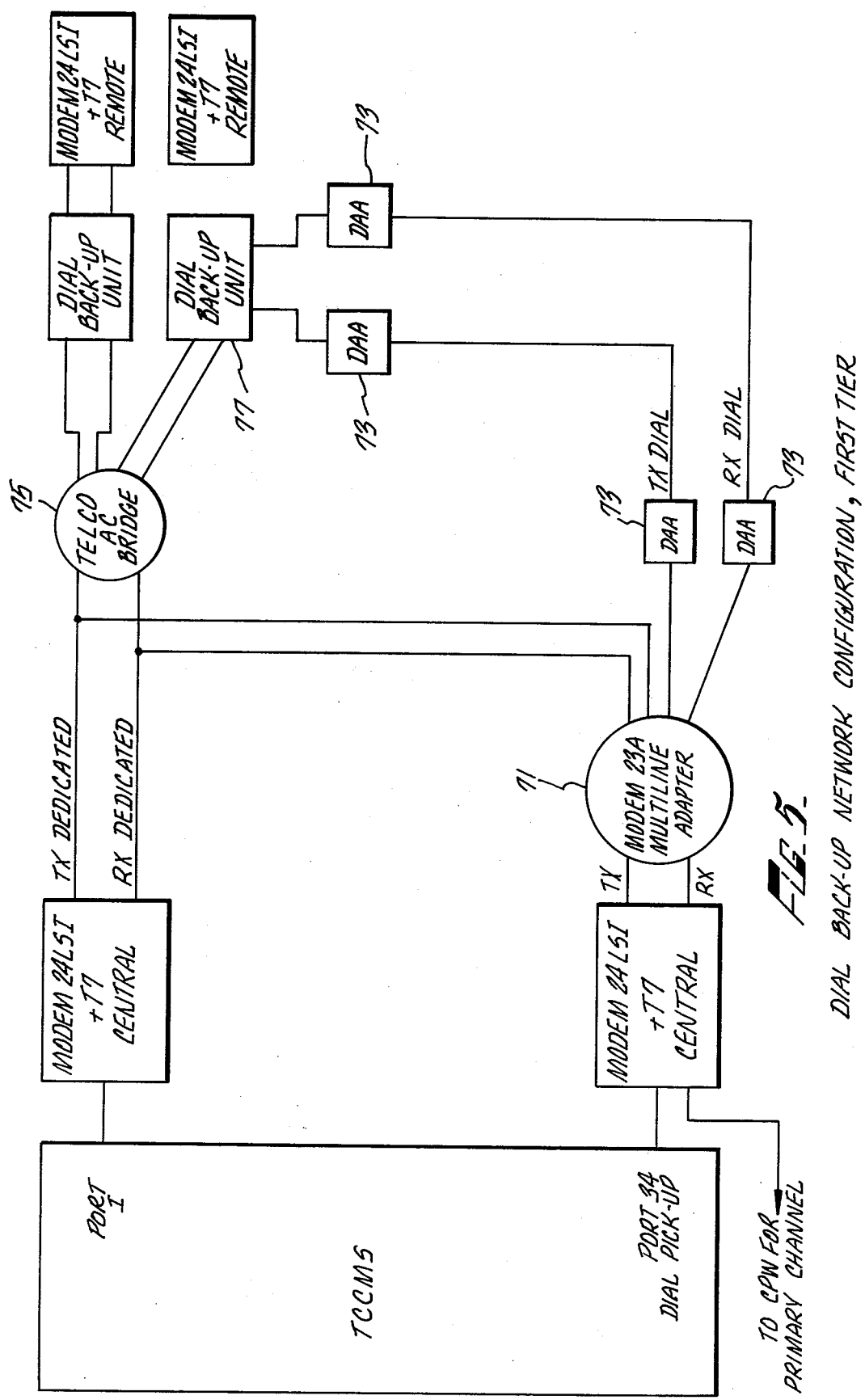

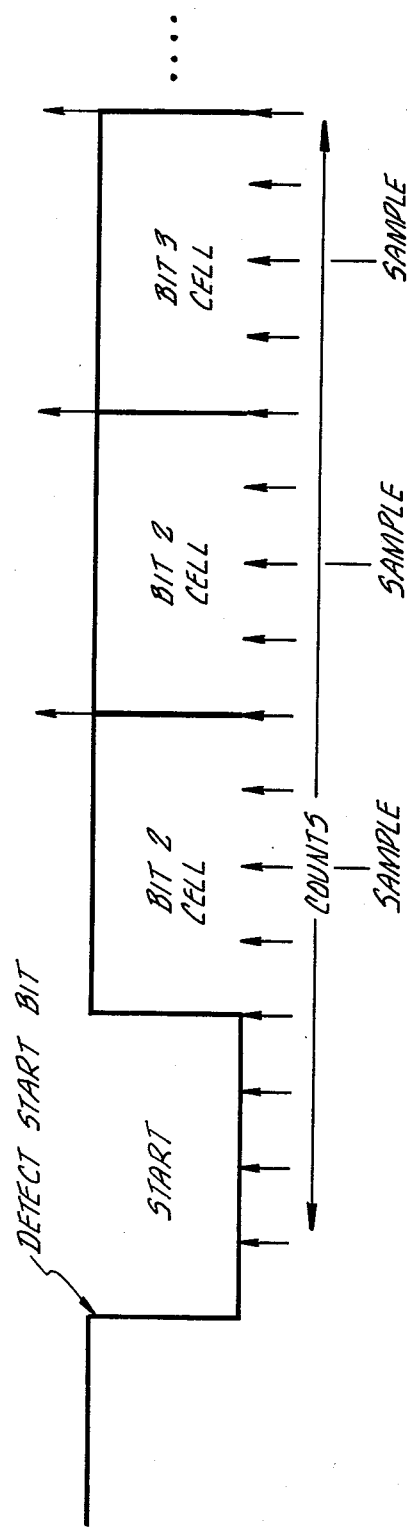

MODEM DIAGNOSTIC AND CONTROL SYSTEM

This is a continuation of application Ser. No. 049,338, filed June 18, 1979, now abandoned, which is a continuation of application Ser. No. 803,945, filed June 6, 1977, now abandoned.

BACKGROUND OF THE INVENTION

The subject invention relates generally to automatic network diagnostic systems and more particularly to a system for automatically testing and controlling, from a central site, a plurality of centrally and remotely located data modems.

With the increasing complexity of distributed data processing systems, particularly those utilizing telephone data communication between central and remote site data processing apparatus and their associated data modems, the need for testing and control of the data modems has increased. The complexity of present and proposed systems requires the ability to communicate rapidly with modems at diverse and numerous sites. Modem malfunctions become increasingly critical in that one malfunctioning modem may interrupt transmission by many others in the network. Since even very small amounts of down time can mean big dollar losses in distributed processing systems, the need arises to automatically control modems in a distributed system to minimize time losses. To provide efficient and effective operation, it would be highly desirable to provide the modem with the capability to raise alarm signals to a central controller and perform the network reconfiguration and control functions necessary to respond to various trouble conditions. Both for speed and reliability, it is desirable to have as many of these functions as possible performed automatically by apparatus of the system.

SUMMARY OF THE INVENTION

It is, therefore, an object of the invention to provide an improved method and apparatus for monitoring, testing, and controlling modems at diverse physical locations.

It is another object of the invention to provide a modem test system wherein apparatus at the modem site detects abnormal conditions of operation and generates mayday messages indicative thereof for transmission to a central system controller.

It is yet another object of the invention to provide circuitry at a modem responsive to signals from a central test unit to perform network control functions at the modem site.

It is still another object of the invention to provide a system capable of performing diagnostics and control for large systems employing a number of modems on the order of 10,000.

These and other objects and advantages are accomplished according to the invention by providing a test and control unit at each modem, responsive to commands from a central system controller. The test and control unit monitors various parameters of the modem. The test and control unit may respond to test commands from the system controller to perform various tests of these parameters and send various status reports back to the system controller. The system controller may automatically scan all primary and secondary drops of the network for modem status without interrupting modem or network operation. The test and control unit may also detect parameters indicating abnormal operation or malfunctions, and send "mayday" alarm signals to the central system controller.

According to the invention, the test and control unit is also capable of responding to commands to control the operation of its' associated modem. Control over the network configuration is also achieved. The system of the invention is applicable to multi-tiered networks.

Some particularly advantageous alarm features implementable according to the preferred embodiment of the invention include the ability to detect streaming conditions and receive-line faults. A particularly advantageous method of handling modem power failure is also provided according to the preferred embodiment.

Another advantage of the preferred embodiment of the invention is the ability to check dedicated lines automatically while still maintaining dial back-up lines in a "hold" state. If the dedicated line is not operative, a mayday alarm is generated and the control unit causes the modem to switch back automatically to the dial lines. Other network control functions include the ability to squelch the modem primary transmitter and the ability to simulate modem power failures in order to ascertain the network configuration and assure proper performance of the power failure detection apparatus.

Another advantage of the disclosed system is that functions may be performed at remote sites autonomously—that is without intervention by the central controller or a human operator, as herein after described.

BRIEF DESCRIPTION OF THE DRAWINGS

The preferred embodiment and best mode contemplated for practicing the just summarized invention will now be described in conjunction with the drawings of which:

FIG. 1 is a generalized block diagram of a portion of a system configured according to the preferred embodiment of the invention.

FIG. 2 is a block diagram of a two-tier modem system incorporating the preferred embodiment of the invention.

FIG. 3 illustrates the data format for transmitting a command according to the preferred embodiment of the invention.

FIG. 4 illustrates the format of a concise status word.

FIG. 5 is a block diagram of a dial back-up technique of the preferred embodiment.

FIG. 22 illustrates the receive function of the test and control unit.

DETAILED DESCRIPTION OF THE PREFERRED EMBODIMENT OF THE INVENTION

Figure 6:
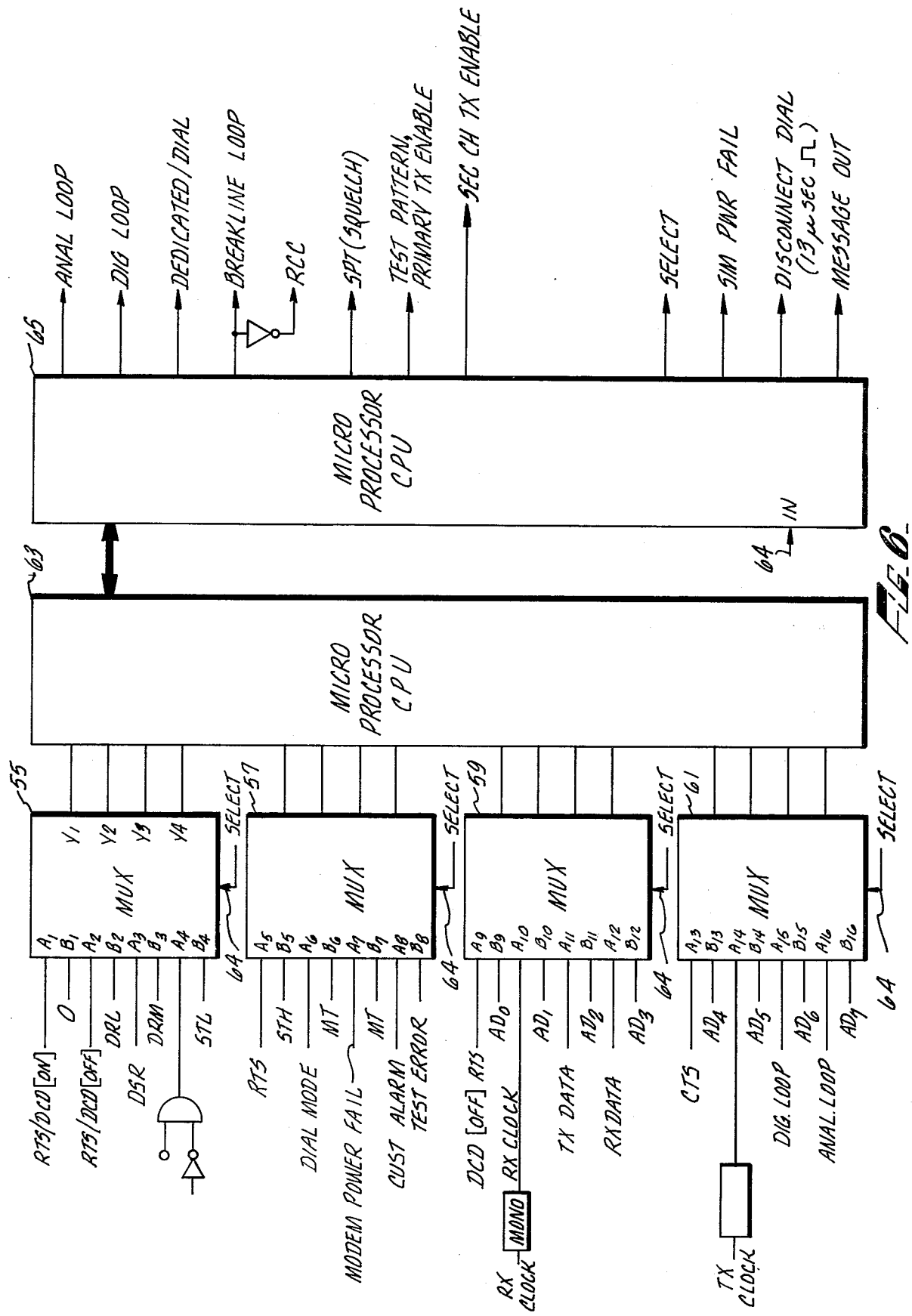
FIG. 6 is a circuit diagram of a test and control unit according to the preferred embodiment.

FIG. 1 illustrates in functional block form a portion of a system according to the preferred embodiment of the invention providing remote test capabilities for modems. Such modems may be, for example, in four wire controlled carrier multipoint or continuous carrier point-to-point data communications networks. Testing is accomplished according to commands sent to system modems such as a central modem 11 and a remote modem 13 by a system controller 15, which may be a programmed minicomputer such as the DEC PDP-11. Testing and control of the remote modem 13 is accomplished under control of a remote test and control unit 17. The test and control unit 17 receives commands transmitted across a secondary channel by the central modem 11. The central modem 11 contains a test and control unit similar to 17.

The test and control unit 17 includes a secondary channel transmitter and receiver 19, a control unit 21, and monitoring circuitry 23. As discussed later, the test and control unit 21 is preferably configured around a microprocessor, which, by way of example, may be a Fairchild F8 CPU and PSU. The test and control unit 17 decodes addresses and commands from the system controller 15, performs a specific test if addressed, frames and formats the test results, and transmits these results back to the system controller 15. Some tests are accomplished without interfering with normal network operation while other tests temporarily interrupt portions of the network.

In addition to responding to certain tests initiated by the controller 15, the test and control unit senses certain anomalous conditions in the modem 13 and transmits suitable alarm messages back to the system controller 15. Because it has the ability to address a particular test and control unit 17, the preferred embodiment is also capable of performing certain network control functions such as dial back-up.

In the preferred embodiment, the secondary channel 25 operates asynchronously at a relatively low speed data rate such as 75 bits per second. The modulation technique utilized by the secondary transmitter and receiver 19 is frequency shift keying (FSK). The tones utilized to encode the data are preferably at 392 Hz and 447 Hz, where a space equals 392 Hz and a mark equals 447 Hz. The secondary channel is transmitted 5 dB below the primary channel of the modem. Tones other than 392 Hz and 447 Hz may also be used.

A typical system configuration according to the preferred embodiment is illustrated in FIG. 2. As shown, the system central controller 15 includes a number of ports 1, 2, 3, . . . N. A number of modems, for example, from 1 to 254, can be associated with each of these ports 1 . . . N. Each central site port 1, . . . N communicates with a central site modem 11, which in turn communicates with a number of remote site modems 13 across a four wire multidrop line 27. These modems 13 are typically synchronous operating but may also be asynchronous types. The 1 to 254 modems can be either centrally or remotely located.

One of the modems 13 is illustrated communicating with a remote controller 29 and a digital mixer 31, which communicate with a number of additional modems 33, 35. Typically, the modems 33, 35 will be asynchronous and are separated by the remote controller 29 from the synchronous modem 13. Central second tier modems 33 communicate across a four wire multidrop line 34 with remote second tier modems 35. The digital mixer functions as an OR-gate 31 to provide a path around the controller for the secondary telemetry channel. In a typical set-up, the modems 13 would be synchronous 2400 bps data sets and each modem 33, 35 would be an asynchronous 1200 bps data set. However, the synchronous 2400 bps data sets may also be used after the controller 29. The remote controller 29 is a standard controller such as might be used in a bank to buffer communication between a number of terminals using modems 33, 35 and the modem 13.

To facilitate communication, each modem 13, 33, 11, 35 has a unique address. The test and control unit 17 of each central site modem 11 receives its test and network commands from the central controller 15 in a digital format. If the central modem 11 has been addressed, its appropriate response will be transmitted back to the central controller 15 by an asynchronous data stream. Each central site modem 11 performs a regenerative function to pass on control commands to remote sites. The digital data received from the system controller 15 by the central modem 11 supplies a modulating signal to the frequency shift key (FSK) secondary channel transmitter 19 in the central site modem 11. This transmitter 19 places the system controller commands in proper analog format for transmission across a telephone line to the remote sites 13. The central site 11 also receives FSK signals from the remote sites 13 in analog form across the telephone line. The secondary receiver 19 in the central site modem 11 demodulates the analog signal to pass an asynchronous bit stream to the system controller 15 at the FSK channel data rate, e.g. 75 bps. The central site test and control unit 17 does not monitor this received bit stream for its own address because it only receives commands from the system controller 15.

The test and control unit 17 at a remote site modem 13 receives its commands in analog format from the central site modem 11. The address command decode logic of the test and control unit 17 receives its commands from the FSK demodulator in the receiver 19. When a particular remote site 13 is addressed, it frames and formats its response to the command presented by the system controller in an asynchronous data stream. This data stream is applied to the FSK modulator in the transmitter 19 where it is converted to an analog format for transmission back to the central site modem 11.

The test and control unit 17 provides the regenerative capability for signals supplied across the digital interface created by the mixer 31. The test and control unit 17 in the modem 13, which is connected to the mixer 31, demodulates commands from the system controller 15 which are in analog format and converts these commands to a digital data stream, for example, at 75 bps. If the data stream is addressed to an asynchronous modem 33, the digital mixer 31 connects the data stream to the secondary channel input leads of all the associated asynchronous modems 33. If one of the asynchronous modems 33 has been addressed and must transmit a response back to the system controller 15, the regenerative function necessary for transmission will be accomplished in the synchronous higher speed modem 13. To accomplish this function, the mixer 31 OR's the secondary channel received data from all of the asynchronous modems and supplies that data to the secondary transmit data input of the synchronous modem 13 in digital format. This digital data system, for example, at 75 bps, is then connected to the FSK modulator in the test and control unit 17 of the modem 13 for transfer back to the system central controller 15.

In operation according to the preferred embodiment, a central site synchronous modem 11 will be in a continuous broadcast mode on its secondary channel. When the system central controller 15 is idle, a 390 Hz tone corresponding to a marking condition is transmitted. In response to this marking condition, the secondary DCD (data carrier detect) line of each remote modem 13 will be activated (on). Also in response to the marking condition, the secondary channel transmitters of each modem 13 are set to be in a controlled carrier mode. These secondary channel remote transmitters at each synchronous modem 13,19 are enabled upon any of the following conditions: (1) The site has been addressed by the central controller 15 and must respond with status or test results (2) it is necessary for the remote site to send an alarm message back to the central controller of its own accord, or (3) secondary DCD from an associated asynchronous modem 33 turns on, indicating the necessity of transmitting information from the asynchronous portion of the network back to the central site.

Normally, all asynchronous central modems 33 are in a broadcast mode on their secondary channel, and all remote asynchronous modems 35 are in a controlled carrier mode on their secondary channel. In implementing this function, secondary DCD from the asynchronous modems will be OR-gated by the gate 31 to the synchronous remote modem 13 to serve as secondary RTS (request to send). No connection like this in the opposite direction is needed because the secondary channel of each central asynchronous modem 33 is in a continuous carrier mode.

According to the preferred embodiment, three general modes of operation are provided. These include test modes wherein the test and control unit 17 performs status reporting and testing functions in response to commands from the system controller 15; monitoring functions, wherein the test and control unit monitors for certain anomalous functions and supplies alarm or mayday messages back to the system controller; and performance of network control functions. Each of these operations will be discussed in further detail below.

All test modes are remotely initiated and terminated by commands from the system controller 15. Of course, various sequences of commands to perform desired combinations of tests may be provided by the system controller 15. These test modes range through various degrees of status checks to actual test runs. As illustrated in FIG. 3, the format for the received test commands is a six word sequence, including a sync word (ASCII delete character), synch word, address word 1, address word 2, command word, and block check character. Each word is eleven bits in length and includes a start bit (logic 0), seven information bits, an even parity bit and two stop bits (logic 1).

The seven bit delete character DEL is composed of all ones and serves to allow the receiver to synchronize to the asynchronous data.

If bit $T_0$ is a logic zero, the message is a command from the system controller 15. If it is a logic one, the message is an acknowledgement from the test and control unit 17. The block check character contains a longitudinal even parity value generated by computing the exclusive OR for each bit position of the two address characters and the command character. For example, the first bit of the block check character is the value obtained by computing even parity for $A_0$, $A_4$, and $C_0$. Replies from the test and control unit 17 have the same format as commands from the central controller 15 with the exception that the first DELETE character is replaced by a MARK character (all 11 bits are logic 1's). Replies are transmitted on a one shot basis. As discussed below, the command word is replaced by either one or three information words. Maydays and concise status require one information word. Extended status and error counts require three information words. The test and control unit 17 will respond to a command from the system controller 15 if the following conditions are met: (1) one DELETE character is detected; (2) an address decode is obtained; (3) parity is correct for each word, and (4) the block check character is correct.

For most of the commands, the test and control unit 17 provides an acknowledgement back to the system controller 15. This acknowledgement consists of an echo of the original command with one control bit $T_0$ changed in Address Word 1. Commands which are not echoed are Squelch Primary Transmitter, Simulate Power Fail, Analog Loop, and all commands which require a response from the test and control unit.

In addition to responding to its own address, a particular test and control unit 17 has the ability to respond to a group address (represented by all zeros). This address addresses each modem on a given port. Any command can be used.

Return to normal (RTN) clears an existing test or alarm mode and stops the transmission of all alarm messages. It further resets all storage registers in the test and control unit 17 and causes the associated modem and its test channel to revert to normal operation. RTN will also clear an existing RSI state. However if the alarm condition persists, the control unit will again transmit another mayday.

The return to normal storage and inhibit (RSI) instruction clears an existing test mode, stops the transmission of all alarm messages and causes the modem to revert to normal operation. However, the existance and type of the particular mayday is saved. RSI inhibits the transmission of an alarm even if the condition still persists, until it is reset by an RTN command. RSI may be used by the central control 15 to clear the network of alarm messages before the central controller institutes diagnostics to isolate a problem. RSI is also used in the situation where mayday messages are transmitted simultaneously from two or more locations. Simultaneous maydays result in the central controller receiving a noncoherent data stream with continuous parity and framing errors. The controller will then transmit an RSI with a group address to all modems on that line. All mayday messages will be inhibited but their existence will be stored. The controller can then selectively address each modem on that line with a dump stored mayday command (DSM) to recover all of the alarm conditions which had previously occurred simultaneously.

The various test modes which may be entered and performed in conjunction with the above command format will now be discussed. These include two types of status checks, concise and expanded. The test functions available include self test, end to end test, analog loop with test pattern, digital loop with test pattern, analog loop and digital loop.

The first of the status monitor modes is concise status monitor. In this mode, the central controller 15 scans a group or all of the modems in the system, sequentially addressing each modem with a transmit concise status (TCS) command. In response, each modem sequentially transmits back to the system controller 15 a concise status word. The concise status word has the format illustrated in FIG. 4. The concise status word contains the following information:

(A) DCD - ON/OFF (remote) or RTS - ON/OFF (central)
(B) DSR - ON/OFF (C) DTE Power - ON/OFF. The voltage level of the RTS lead from the data terminal equipment is continuously monitored. Specification RS232C requires that the voltage of any DTE interface lead be between +3 and +25 volts or between −3 and −25 volts. The status monitor yields an off condition for this parameter if the monitoring circuit senses a voltage level between −3 volts and +3 volts as an open circuit.

(D) Modem in either Locally or remotely initated analog or digital loop - YES/NO (E) Modem is either a Central Site or Remote Site (for multipoint) RTS - ON/OFF (remote), DCD - ON/OFF (Central) [point to point]

(F) Logic 1 indicates that modem is connected to dial lines and logic 0 indicates that modem is connected to dedicated lines.

(G) Signal Quality - ON/OFF. An ON condition corresponds to either the case where there exits a low probability for error on the primary channel (GOOD QUALITY) or DCD is off when the signal quality lead is checked. An OFF condition corresponds to the case where DCD is on and signal quality is unacceptable.

In the preferred embodiment, the controller does not evaluate the status reply response. A second type of status monitor available is the expanded status. In the expanded mode, the system controller 15 transmits a Dump Modem Status (DMS) command. Receipt of this command by the test and control unit 17 will result in the transmission of a three word status message. The first status word is the same as for the concise status mode. The format for the second and third words is as follows:

Status Word 2

Bit 0—DCD (central or RTS (remote) - current state [multipoint] Logic 0 (point to point)
Bit 1—Receive Clock - transitions are occurring at the data rate of the modem
Bit 2—Transmit Data - current state
Bit 3—Receive Data - current state
Bit 4—CTS - current state
Bit 5—Transmit Clock - transitions are occurring at least at the data rate of the modem
Bit 6—Digital Loop - the modem is in either a local or remote digital loop mode.
Bit 7—Parity

Status Word 3

Bit 0—DCD Transitions (central multipoint) - at least one one transition has occurred since the last DMS command. RTS Transitions (remote multipoint) - Logic 0 for point to point
Bit 1—Not Used
Bit 2—Transmit Data Transition
Bit 3—Receive Data Transition
Bit 4—CTS Transition
Bit 5—Modem Type
Bit 6—Modem Type
Bit 7—Parity A first of the possible modes performable is the self test mode. This test can be performed on either a central or remote modem. When placed in a self test mode, the transmit output of the modem is connected back to its receive input. Internal RTS of the modem is turned on. A pseudorandom test pattern generator is connected to the modulator input and a pattern detector and error counter is connected to the demodulator output. Errors are accumulated for transmission back to the system controller 15 on the secondary channel. The secondary channel analog transmitter is connected to the telephone line. This connection is not made for the primary channel, which contains the test pattern. Normal primary channel data traffic is affected only in that the transmission from the modem under test is inhibited. To perform this test, the system controller transmits in sequence a self test enable (STE) command, an enable error counter (EEC) command, a dump error count (DEC) command and a return to normal (RTN) command.

In response to the STE command, the test and control unit 17, causes the modem transmit output to be connected to its receive input, turns internal RTS of the modem on, and enables the test pattern generator and detector. The EEC command resets the error counter and initiates the accumulation of errors. The delay between the STE and EEC command provides sufficient time for the scrambler and descrambler to synchronize.

After the STE and EEC commands have been performed, the DEC command initiates reply back to the central system controller 15. The system controller performs the timing function to determine the length of the self test run. An approximate error rate (errors in $10^6$ or errors in $10^5$ can then be computed by the system controller 15).

The format of the response of the test and control unit to a DEC command is as follows:

Error Count Word 1

Bits 0-6—Character error count - binary coded number which represents the number of parity or framing errors in all messages received from the system controller since the last DEC command.
Bit 7—Parity

Error Count Word 2

Bits 0-3—Low order 4 bits of the primary channel test error count
Bits 4-6—Logic 0's
Bit 7—Parity

Error Count Word 3

Bits 0-3—High order 4 bits of the primary channel test error count
Bits 4-6—Logic 0's
Bit 7—Parity A total of 8 bits in a binary coded format are utilized for the primary channel test error count. Hence, it is possible to count up to 255 test errors. All error counts are reset to zero after being reported. Character errors are tabulated for all messages received by a particular test and control unit whether or not that modem has been addressed. An incorrect block check character is counted as one character error. Proper framing for a received character is determined in the following manner:

(1) A MARK to SPACE transition is recognized as the beginning of a start bit.
(2) The center of the start bit is checked to see that it is still a SPACE. If it is not, one character error is counted.
(3) The 9th bit after the start bit is checked to determine if it is a proper stop bit (MARK). If this is not the case, a framing error is recognized and the character error counter is incremented by one.

The character error count for a particular modem in the system provides an indication of the quality of the secondary channel data received at that location.

After the error information is transmitted back to the system controller 15, the controller 15 generates an RTN command. Upon receipt of this RTN, the test is terminated and the modem reverts to normal operation.

A second type of test performable by the preferred embodiment is an end-to-end test between a central modem and a remote modem. Such a test is a full duplex test with an error count obtained for the receiver of each modem. Normal primary channel data traffic is inhibited during this test for all the modems branching off of a particular central site. As in the case of self test, the internal scrambler/descrambler of the modem is used to generate and detect the test pattern. To implement this test, the central system controller 15 transmits in sequence the following commands: test pattern enable (TPE), EEC, DEC, and RTN.

The system controller 15 will sequentially send the TPE command first to the central modem and then to the remote modem. The TPE instruction enables the pseudo random pattern generator in the modem transmitter and the pseudo random pattern detector in the modem receiver. Internal RTS of the modem is forced on. A delay is provided before the next EEC command to allow the scramblers and descramblers in the two modems to synchronize.

The other commands EEC, DEC, RTN cause the test and control unit to perform as discussed above. The EEC command is sent first to the central modem and then to the remote modem, as is the DEC command.

Another form of test enabled by the subject preferred embodiment is an analog loop with test pattern, which is always conducted between a central and remote modem. This test is operator-controlled and may take advantage of the fact that the central system controller 15 can have the network structure stored in its data base. For example, the operator of the system controller 15 presses in sequence first an analog loop key and then a test key. Then, it is only necessary for the operator to key in the address of the remote modem. Since the system controller has the network structure stored in its data base, the address of the central site will be implicit in the command. The system controller 15 can then address the necessary analog loop test commands to the proper site.

To perform the analog loop test, an analog loop command is transmitted by the system controller 15 to the remote modem and a test pattern enable command is transmitted to the central modem. The test and control unit is designed such that even though placing the modem in an analog loop mode causes loss of carrier, a subsequent receive line fault mayday will not result. The sequence of commands utilized is discussed in the following paragraph.

In performing the analog loop test pattern mode, an analog loop (ACL) command is sent to a remote site under test. The analog loop command causes the receive input of the modem under test to be connected back to its transmit output through a stage of gain. Next TPE is sent to the central site, enabling its scrambler and descrambler. An EEC command is also sent to the central site to initiate the accumulation of errors. Next DEC is sent to the central site where it elicits a reply, including the error count at the end of the test in an 8-bit binary format. RTN is then sent to all modems on the central line, utilizing the group address previously discussed. The sequence of commands emanating from the central controller during this test may be summarized as follows:

(RMT ADD 3) (ACL), (CEN ADD) (TPE), (CEN ADD) (TPE), ack. back to CSC 15

(CEN ADD) (EEC), (CEN ADD) (EEC), ack. back to 15

(CEN ADD) (DEC), (CEN ADD) (ERROR COUNT), (GROUP ADD) (RTN), response to CSC 15

The repertoire of commands for the test and control unit includes a Stop Error Counter (SEC). Receipt of this command causes the accumulation of test errors to cease and the total to be stored. This command is useful for modems which loop both the primary and secondary channels in an analog loop mode. This would result in the controller receiving echoes of its own channels. SEC can be used to hold an error count while the modem is removed from an analog loop mode.

A digital loop with test pattern mode is also available. This test follows the same format as the previously described analog loop test. Central site modems are not placed in a digital loop mode. The test is conducted between a central site and a remote site. The scrambler/descrambler and error counter are enabled for the central modem. The remote modem is placed in a digital loop mode. In this mode, received data becomes transmit data, received clock becomes an external transmit clock, DCD becomes RTS. The DTE loop serves to isolate the DTE from the modem. DSR will be off at the interface to indicate to the controller that a test is in progress A digital loop command (DCL) is first sent to the remote site which is under test. TPE is then sent to the central site, followed by EEC, followed by DEC after the central system controller 15 has timed out the appropriate length of the error count. Finally, RTN is transmitted by means of the group address.

A final test mode available is the analog loop, or digital loop mode wherein the scrambler and descrambler and error counter of the central modem are not enabled. The central site modem operates in its normal mode. The test is performed according to the following sequence of commands: ACL or DCL to remote site under test, and RTN by group address. This test mode enables connecting external test sets to the central modem site.

As before noted, the test and control unit 17 has the ability to monitor its associated modem for certain anomalous conditions and transmit alarm messages back to the central controller 15. The format for the transmitted messages is the same as for the concise status message. Each possible alarm condition is assigned a bit position in the mayday word. Presence of the mayday is indicated by a one in the corresponding bit position. All other bits are logic 0's. The alarm bit assignment is as follows:

Bit 0—Customer Alarm
Bit 1—Streaming
Bit 2—Receive Line Fault
Bit 3—Modem Power Failure
Bit 4—Dedicated Line Not Restored
Bit 5—0
Bit 6—0
Bit 7—Parity A mayday message is continuously transmitted by the test and control unit 17 until it receives an RTN or RSI command from the central system controller 15. The RTN command stops transmission of the mayday but if the cause of the alarm persists, further alarms will be transmitted. RSI will inhibit the transmission of an alarm, even if the cause still persists until reset by an RTN command. A single exception to this rule is the receive line fault mayday, which alarm message is controlled to exist for a fixed period, e.g. 12 seconds at 75 bps. As noted earlier, the RSI command will inhibit the transmission of alarm messages by the test and control unit 17, but the condition which caused the alarm will be stored. With the network then free of alarms, diagnostic procedures can be undertaken either with the aid of the system controller 15 (using the Dump Stored Mayday command) or by other procedures, to determine the cause of the problem.

There exists the possibility that multiple mayday messages may be transmitted simultaneously or that a mayday from one modem may be transmitted while another modem is responding back to the system controller 15 with test or status information. In either case, the result will be that the system controller 15 will detect framing errors on its receive data line. After a certain number of framing errors are counted, the system controller will cease issuing test commands. If the framing errors persist, the system controller 15 will transmit an RSI command with a group address. This RSI inhibits all mayday messages from the group, and causes their storage at the sites which have experienced an anomalous conditions. The system controller 15 may then poll each site on the central line with a DMS command to dump the stored mayday status. Receipt of this command at a remote site which has stored a mayday message results in retransmission of the mayday message back to the central system controller 15. In this manner no mayday message will be lost. The following paragraphs describe mayday messages provided according to the preferred embodiment of the invention.

If the request to send signal from the data terminal equipment DTE associated with a particular modem is held in an "ON" condition for an excessively long time, preventing other modems on a multidrop line from transmitting, the test and control unit 15 will send a streaming alarm (STR) back to the system controller 15. An "excessive" period of time may be identified according to a strap selection. Remote site test and control units 17 sense RTS being on for a prolonged period of time while central site test and control units sense DCD indicating the presence of carrier from a remote modem.

The central modem is always strapped for a longer stream time than its associated remote modem. In this way if the streaming condition is due to RTS being ON for a long period of time, the remote modem will always mayday first, and for a period of time there will be no multiple mayday signals. If a streaming mayday is only received from a central site, then it is known that the condition has been caused by a modem failure and not interface RTS being on for a long period of time. The test and control unit 17 transmits this alarm until it receives a RTN or RSI command from the system controller 15. RSI always squelches a mayday. RTN will not, if the mayday condition is still present upon RTN receipt.

A customer alarm message (CAM) may also be provided in response to an extra input signal from the customer. In response to an ON condition, a mayday message is transmitted back to the system controller. Again, the alarm is squelched by receipt of either RTN or RSI.

The failure to detect a carrier on the primary data channel of a remote modem or RTS being off at a central modem for a prolonged period of time will cause the test and control unit 17 to transmit a receive line fault (RLF) mayday message back to the central system controller 15. This period of time may, for example, be 3.4 seconds. The RLF alarm is transmitted for a period, for example 8–13 seconds, and then squelched automatically by the test and control unit 17. It cannot be terminated by a command from the system controller 15 because the receive line to the modem has failed. After the mayday times out, the alarm condition is stored and a DSM command again produces the mayday. Only the RTN command can clear the stored mayday. The central modem operates in a continuous carrier mode and has its RTS on continuously. Its associated remote modem has DCD on continuously. A remote modem transmits a RLF mayday if primary channel DCD is off for 3.4 sec. A central modem transmits a RLF mayday if RTS is off for 3.4 sec. If a central modem failure occurs so that RTS is off, both the central and remote sites will transmit maydays simultaneously and framing errors will occur at the system controller 15. The DSM command can then be used to recover both mayday messages. If a telephone line failure occurs then only the remote modem will respond. If a fault occurs on the 4 wire trunk from the central modem to the bridge from which lines to individual remote modems branch out, all modems associated with the central site will experience a receive line fault. This condition results in the transmission of simultaneous multiple alarm messages back to the system controller 15. The existence of simultaneous messages on line may prevent the system controller 15 from decoding a unique alarm. Only after the receive lines have been restored can the DSM command be used to determine which modems have previously experienced a failure.

The test and control unit 15 utilizes an auxiliary power source to generate and transmit a tone whenever a modem power supply failure occurs. This alarm is termed modem power failure (MPF). The central site modem of the port branch in which the power supply failure occurs detects the MPF tone and transmits an alarm message with its own address to the central controller 15. The central controller may then conduct a scan of the modems associated with the central modem which transmitted the MPF mayday. The results of this scan are then analyzed by the central controller to determine which modem in the network has the failed power supply.

Since the only line of communication between the central site modem unit 11 and the system controller 15 are transmit and receive secondary data channels, no power fail alarm signal is provided for these modems. A digital power fail alarm signal is generated for second tier central site modems 33. This digital alarm is necessary because the interface between the two modems 13, 33 is of a digital nature. Hence, if a second tier central modem 33 experiences a power supply failure, it will present a digital alarm signal across the DTE interface to its associated modem 13. This modem 13, which is actually a remote site modem of another central line will detect the digital power failure alarm condition and will send an analog power fail signal with its address to the system controller 15. The digital alarm signal lead is bidirectional. By strap selection it will be an output if the synchronous modem is a central site modem 11 and an input if the synchronous modem is a remote site modem 13.

Finally, a dedicated line not restored (DNR) message is supplied in a situation where a dial back-up connection has been made but the modem has been temporarily switched back to the dedicated line to determine if the dedicated line has been restored. If the modem has not received a transmit concise status (TCS) command from the system controller 15 within 10 seconds after a switch has been made to the dedicated line, a switch back to the dial line will be automatically initiated and the DNR alarm will be transmitted over the dial line. The purpose of the DNR alarm is to indicate to the system controller 15 that the modem has been switched back to the dial line. The system controller 15 could then transmit either an RTN or RSI command over the dial line to squelch the alarm message as discussed above.

An additional feature of the test and control unit 17 is its ability to cause its associated modem to respond to certain network control commands which are generated by the central controller 15. These commands have the same format as the test commands previously discussed. Commands provided according to the preferred embodiment are discussed in the succeeding paragraphs.

The squelch primary transmitter (SPT) command has been mentioned previously. In response to this command, the test and control unit causes the primary channel transmitter of the addressed modem to be squelched and sets DSR at the DTE interface to an "OFF" state by forcing internal RTS of the modem to an off condition.

The SPT command is used when streaming is detected. After the central controller supplies an RSI command, the next step is for the central controller 15 to transmit an SPT command. Receipt of this command stops the streaming condition and also causes DSR to drop. With DSR off, the DTE may turn its RTS signal off. If this should occur, the cause of the streaming condition will have been removed. The system controller 15 may then send a dump modem status DMS command to check if RTS is now in an "OFF" condition. If dropping the DSR does not cause RTS to be turned off, operator intervention at the remote site will be required to remedy the difficulty. The site with the streaming terminal will be temporarily inoperative. However, with the SPT command still in effect, the other sites on the central line can now communicate with the central modem.

The SPT command also provides a diagnostic tool in the situation when two or more sites respond to the same primary channel address, for example when a DTE is programmed for an incorrect address. The SPT command can be used to selectively squelch certain remote sites, using the secondary channel addressing scheme. The operator at the central site may then determine which DTE is responding incorrectly.

An additional network command which may be provided is one to simulate power failure, termed SPF. Upon receipt of this command, the test and control unit 17 enables the power failure mayday circuits and causes either the power fail tone (remote site) or digital power failure pulse (central site) to be transmitted. This command SPF can then be used as a test function to insure that the power failure circuits are operating properly.

The SPF command may also be used as an aid to the central controller 15 in checking the actual network configuration. In its data base, the system controller 15 may have the entire network configuration stored. Each remote modem is associated with a particular central line, as already discussed. The accuracy of the configuration information stored by the system controller 15 may be checked by causing the remote modem to transmit a power failure mayday and then monitoring which central modem 11 responds to the central controller 15. In this manner, one may detect if a particular remote modem is operating through the central modem which the system controller 15 thinks it is.

As illustrated in FIG. 5, the preferred embodiment provides an advantageous, automatic dial back-up arrangement. FIG. 5 represents the first tier of the network shown in FIG. 2 Dial back-up is implemented by utilizing a well-known multiline adapter 71, a number of data access arrangements (DAA) 73, and their associated telephones and a dial back-up unit 77. The adapter 71 provides an AC bridge to connect the transmit and receive line pairs of the central site modem to the associated remote site modems. For the dedicated lines, the telephone company supplies this function by means of an AC bridge 75, usually located in the telephone company central switching office. The AC bridge 75 communicates with a dial back-up unit 77 at each remote site, which unit 77 simply switches the remote modems between the dial and dedicated lines. Hence, each of the calls placed from the central site will be automatically answered at the unattended remote site.

When a failure occurs, it is necessary to place two phone calls to the remote site, one to each DAA 73. The number of remote sites which must be dialed depends upon the location of the telephone line fault. If a fault occurs between the central site modem and the telephone company AC bridge 75, all of the remote sites must be dialed. If a fault occurs on one of the lines from the bridge 75 to a remote site, then only that location must be called. For this case, the dedicated lines to the telephone company bridge 75 must also be connected to the multiline adapter 71.

Once a remote site modem has been dialed, the system controller 15 is utilized to send a Switch to Dial Back-Up command to that modem. In response, the test and control unit 17 changes the state of a Dedicated/Dial control signal to the dial mode indication and hence, will be in "sync" with the state of the dial back-up unit 77 (FIG. 5). A check for possible restoration of the dedicated connection is then made by sending a switch to dedicated line (SDL) command to the remote site's test and control unit 17 over the dial lines. Upon receipt of this command SDL the test and control unit 17 will transmit a control signal to the dial back-up unit 77 which will cause the dial back-up unit 77 to switch the modem to the dedicated lines. The test and control unit 17 contains a timer circuit which is enabled when the switch from the dial lines back to the dedicated line occurs. If the test and control unit 17 does not detect a transmit concise status (TCS) command on the dedicated channel within a fixed interval, for example 3.4 seconds, the test and control unit 71 will send a control signal to the dial back-up unit 77. This control signal causes the dial back-up unit 77 to switch back to the dial lines. Over the dial lines, the test and control unit 17 will send a dedicated-line-not-restored (DNR) mayday back to the central controller.

If the dedicated line has been restored, an end-to-end test is conducted between the central and remote modems to determine if the line is of satisfactory quality. If the error rate is satisfactory, the system controller 15 will transmit a disconnect dial back-up (DDB) command over the dedicated line to the remote site. Upon receipt of this command, the test and control unit 17 sends a signal to the dial back-up unit 77 which causes it to hang up the dial lines. If the error rate, determined in the end-to-end test, is not satisfactory, the system controller 15 will transmit a switch to dial back-up (SDB) command over the dedicated line to the remote site. Upon receipt of this command, an appropriate control signal is transmitted from the test and control unit 17 to the dial back-up unit 77 to switch the transmit and receive lines of the modem to the dial lines.

If the test and control unit 17 is in the dial mode and it detects a receive line fault, it will transmit the required mayday and will generate a disconnect dial pulse. This is the same pulse that is generated in response to a DDB command. Receipt of this pulse by the dial back-up unit 77 will cause it to hang up the dial lines and switch the modem to the dedicated lines. If the dedicated line has not been restored, the operator at the site of the system controller 15 can again place the required calls to establish the dial back-up connection. If it were not for this protocol, it would not be possible to reestablish the dial connection because subsequent calls would encounter a busy signal (dial back-up still holding the dial lines).

According to the preferred embodiment, it is possible to use the secondary channel as a data channel. For this purpose, the repertoire of commands includes an Inhibit Test and Control (ITC) command. Upon receipt of this command from the system controller 15, the test and control unit 17 will not monitor its received secondary channel data for possible test and control commands. Hence, it will not inadvertently go into a test mode by decoding a command in a random data stream. If an alarm condition occurs while the modem is in an ITC mode, the test and control unit 17 will clear this mode and will transmit the appropriate mayday. A Return to Normal (RTN) command resets to normal operation when it is desired to remove it from an ITC mode. Use as a data channel is preferably subject to the following limitations in the preferred embodiment:

1. No secondary CTS.
2. 4 Wire operation.
3. Only secondary RTS control. No reverse channel operation under control of primary RTS.
4. If the modem is a central site of a multidrop network, it must operate in a continuous carrier mode on the secondary channel.
5. If the modem is a remote site of a multidrop network, its secondary channel is operated in a controlled carrier mode but secondary DCD will not be present at the DTE interface.
6. The data transmitted by the secondary channel cannot include either the RTN or RSI commands. For a central site modem, if the received data is in a SPACING condition for greater than 300 msec, it will be clamped at the DTE interface to a MARK until a SPACE to MARK transition occurs.

When operated in a data mode, the secondary channel accepts 0-150 bps asynchronous data.

FIG. 6 illustrates a particular structure for a test and control unit according to the preferred embodiment of the invention. The test and control unit includes four multiplexers, 55, 57, 59, 61, a microprocessor central processing unit (CPU) 63, and program storage unit (PSU) 65. The multiplexers 55, 57, 59, 61 serve to double the number of possible inputs to the microprocessor CPU 63. Each multiplexer has eight inputs $A_n$, $B_n$, and four outputs, $Y_n$. Each of the multiplexers are controlled by a select line 64 on which a control signal is outputted from the PSU 65. when the select lines 64 are activated (are a logic 1), the $B_n$ inputs to the multiplexers are gated to the multiplexer outputs $Y_n$, while if not select signal (the select lines are a logic 0) appears, the $A_n$ inputs are gated to the outputs $Y_n$. Thus, the mircoprocessor 63, 65 selects the set of inputs it will need for a particular operation under program control. Thirty-two possible inputs to the microprocessor exist. The various input signals may be level converted as necessary.

The signal on the $A_I$ input represents either primary RTS of a remote site, primary DCD of a central site, or a logic high or low. If the modem is operating as a remote unit in a point-to-point configuration, the input is RTS of the remote modem. If the modem is operating as a central unit in a point-to-point configuration, the input is DCD of the central unit. If the modem is operating as a remote modem in a multipoint network, the input is a high logic level, whereas if the modem is operating as a central unit in a multipoint network the input $A_I$ is a low logic level. The $B_I$ input is a fixed low logic level, representing no input. The output is $A_I/0$. Thus, in a point-to-point configuration, RTS/DCD is saved for status purposes. Otherwise, the $A_I$ input indicates whether the modem is a remote or central multipoint unit.

If the modem is operating as a remote unit, the $A_2$ signal is DCD; and, if the modem is operating as a central unit, the signal is RTS. For a remote unit, DCD should always be on, as should RTS for a central unit. An off condition at $A_2$ thus indicates a receive line fault. The $B_2$ input is one bit of a speed select code, either a logic 0 or logic 1. The output $Y_2$ is then a receive line fault signal or one bit of the speed select logic code. The speed select code is used to program the particular data rate at which the secondary channel of the system is to operate.

The $A_3$ input signal is primary DSR and the $B_3$ input signal is the second bit of the speed select code, either a logic 0 or logic 1. The output $Y_3$ is then either DSR or a second speed select bit. The inputs $B_2$ and $B_3$ thus supply a two-digit speed code upon proper selection by the select line 64 to the miltiplexer 57.

The $A_4$ input is a signal quality indication. The signal quality indication may be developed from primary DCD and the signal quality level produced by the associated modem. The modem signal quality indication is inverted and serves as an input to an AND gate. The other input to the AND gate is primary DCD, and the output of the AND gate is the $A_4$ input. An off condition at the output of the AND gate indicates that DCD is on and the signal quality is poor. The $B_4$ input is binary logic level, which serves as a one bit of a stream time code STL. The $Y_4$ output is alternatively a signal quality indication or the STL bit.

The $A_5$ input is primary RTS from the data terminal equipment DTE. Primary RTS is preferably supplied to the circuits of FIG. 4 by a window comparator which monitors the voltage of the RTS lead circuit. An "OFF" condition is supplied to the $A_5$ input if this voltage is between ±3 volts or an open circuit, this indicates data terminal equipment power failure.

A strap may be provided to connect the primary RTS to a bias voltage supply in case a DTE not providing RTS is being used. The $B_5$ input is the other bit of the stream time code STH. The $Y_5$ output is then either an indication of whether the data terminal DTE has power, or is a second stream time code bit STH, depending on the state of the select line 64.

The $A_6$ input signal is a dial mode status bit. This bit indicates that the modem is operating either on a dedicated or a dial line. The $B_6$ input signal is the first bit of a modem type code. The $Y_2$ output signal is then either a dial mode indication or a modem type indication.

The $A_7$ input signal in a remote modem is a digital power fail pulse from an associated second tier central modem indication. For central site modems the $A_7$ input is demodulated received data. This also serves as a power fail indication. If a remote modem, connected to a particular central modem, experiences a power failure, then it will transmit a tone corresponding to a SPACING condition on the secondary channel. Detection of the SPACING condition for a particular period of time causes the central modem to transmit a modem power fail mayday. The $B_7$ input is the second bit of the modem type code. The $Y_7$ output provides a power fail indication or a second modem type bit. The $B_6$ and $B_7$ inputs form a modem type code.

The $A_8$ input is a customer alarm signal. This signal is provided by the modem user and may, for example, be a burglar alarm. The $B_8$ input is a bit stream representing the number of test errors occurring during a modem test. The test error signal may be provided by gating a test level with the receiver clock and supplying the result to the $B_8$ input. The $Y_8$ output is either a customer alarm or an error signal.

The $A_9$ input is either DCD (OFF in test) in central multipoint modems or RTS in remote multipoint modems. In point-to-point modems, the $A_9$ input is grounded. The $A_9$ input serves to detect a streaming condition. If DCD or RTS for the central and remote modems, respectively, is continuously on for an inordinate period of time, a streaming condition is indicated. In point-to-point operation, no streaming condition is necessary because no other modems would be interfered with. Therefore, in point-to-point, the streaming input is effectively disabled by the connection to ground. The $B_9$ input is a first bit $AD_0$ of the eight bit test and control unit address. The output $Y_9$ is thus either a streaming indication or the first address bit.

The $A_{10}$ input supplies a signal which indicates that the receiver clock is operating properly. This signal is developed by feeding the receiver clock to a retriggerable monostable multivibrator. The pulse width of the monostable is set such that if the receiver clock is at the proper frequency, a continuous pulse level is produced at the output of the monostable. The input signal to the input terminal $B_{10}$ is the second bit of the test and control unit address $AD_1$. The output signal $Y_{10}$ is the receive clocking indication or the second address bit. The $A_{11}$ input is primary channel transmit data of the modem.

The input to the terminal $B_{11}$ is the third bit of the microprocessor address $AD_2$. The output $Y_{11}$ is either an indication of the state of modem transmit data or the third address bit $AD_2$.

The input signal to terminal $A_{12}$ is the receive data signal while the $B_{12}$ input is the fourth bit in the test and control unit address $AD_3$. The output $Y_{12}$ is either the receive data state or the fourth address bit $AD_3$.

The input $A_{13}$ to the multiplexer 61 is the modem Clear to Send signal CTS, whose current state is monitored, and the input to terminal $B_{13}$ is the fifth address bit $AD_4$. The output $Y_{13}$ is then either the Clear to Send signal CTS or the fifth address bit $AD_4$.

The input to $A_{14}$ is a transmitter clocking signal. This signal is again produced from the transmitter clock utilizing a retriggerable monostable circuit, as previously described for the receive clock. The $B_{14}$ input is the sixth test and control unit address bit $AD_5$. The output $Y_{14}$ is an indication of the transmit clock operation or the sixth address bit $AD_5$.

The input $A_{15}$ is an indication of whether or not the modem is in the digital loop test mode. The digital loop signal is tapped from the digital loop control output of the microprocessor PSU 65. The input $B_{15}$ is the seventh test and control unit address bit $AD_6$. Therefore, the output $Y_{15}$ is either the digital loop mode indication or the sixth address bit $AD_6$.

The final multiplexer input $A_{16}$ provides an indication of whether the modem is in the analog loop test mode. This signal is again tapped from the analog loop control signal at the output of the microprocessor PSU 65. The $B_{16}$ input is the last test and control unit address bit $AD_6$. Therefore, the output $Y_{15}$ is either the digital loop mode indication or the sixth address bit $AD_6$.

The final multiplexer input $A_{16}$ provides an indication of whether the modem is in the analog loop test mode. This signal is again tapped from the analog loop control signal at the output of the microprocessor PSU 65. The $B_{16}$ input is the last test and control unit address bit $AD_7$. The output $Y_{16}$ provides an indication to the microprocessor of whether or not the modem is in the analog loop test mode or alternatively provides the eighth and the final address bit $AD_7$. The address bits $AD_1$, $Ad_2$... $Ad_7$, are selectively connectable to 0 and 1 logic levels to set the address of the test and control unit in any particular modem site. Formatted data including commands are received by the microprocessor PSU 65 at a receive data input 64. The formatted data is then transformed by the microprocessor, as later discussed.

The microprocessor PSU 65 supplies a number of control signals to its' associated modem, as well as transmit and receive signals. As discussed above, the analog loop and digital loop control signals cause the modem to perform either the analog loop or digital loop self tests. A dedicated/dial control signal controls whether the modem is connected to the dedicated or dial-up transmission line. This control signal provides automatic switching between the dial and dedicated lines. The break line loop control signal is activated in the self-test mode to disable the connection of the telephone line loop which normally occurs in the analog test mode. At the same time, the inverse of the break line loop control signal RCC disables the primary channel's test pattern signal from appearing on the telephone lines. The secondary channel may then be used to transfer the self-test results back to the modem. The SPT control signal causes the primary transmitter to be squelched at proper times in response to a SPT command from the controller. The TPE control signal enables the test pattern generator and detector in the associated modem for particular test operations. The secondary channel transmit enable signal controls the activity of the secondary channel transmitter. The disconnect dial control signal is a 13 microsecond pulse, which disconnects the modem from dial lines. Messages which are formatted for response back to the system controller are outputted in the proper format at the message out terminal. At remote sites, data ouputted from the message out channel is applied to the modulator for transmission on the secondary FSK channel. At central sites, the message out of the microprocessor PSU is OR gated with secondary channel receive data, which has been demodulated from a remote site. Finally, the SPF output control signal is a control signal which causes the apparatus to simulate a power fail for purposes of checking out the power failure circuitry.

Figure 7:
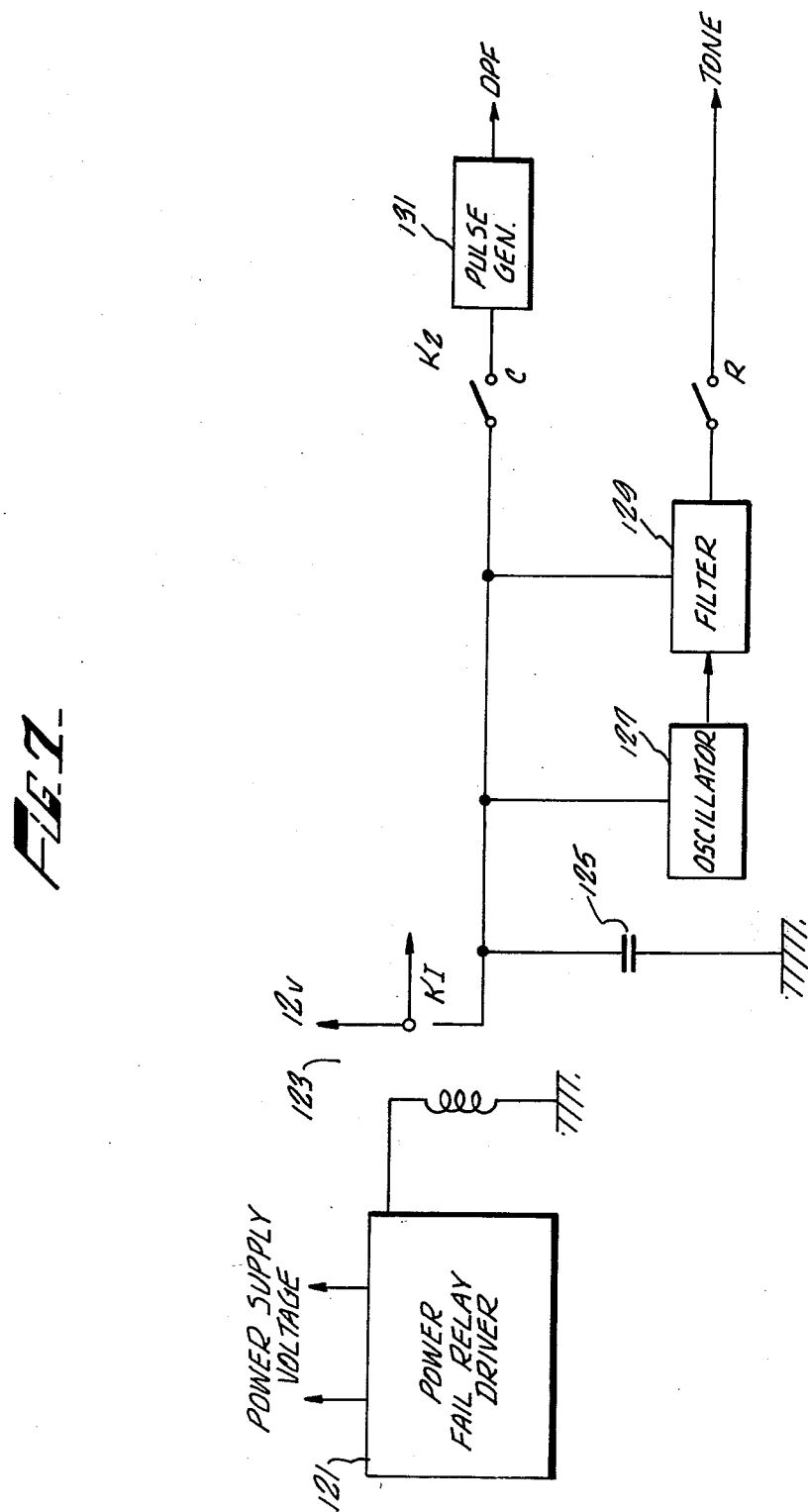
FIG. 7 is a circuit diagram of receive-transmit circuitry of the preferred embodiment.

This power fail circuitry is illustrated in FIG. 7. As shown, the power fail sensing circuitry includes a power fail sensing relay driver 121, a relay 123, a capacitor 125, a power fail oscillator 127, and a low-pass filter 129. The power fail sensing relay driver 121 detects an AC power failure, for example, a blown fuse or a pulled plug. It also senses short circuit or open circuit conditions on any of the modem power supply voltages and opens on the secondary power side. When a power failure is detected, relay contact $K_1$ opens and relay contact $K_2$ closes. The opening of $K_1$ insures that the power fail oscillator and low pass filter are powered solely by the capacitor. When the capacitor discharges the oscillator stops and the power fail tone ceases. It is desirable that this tone by only transmitted on a one shot basis. The closing of $K_2$ applies the tone to the output of the modem. The frequency of the tone corresponds to a SPACING condition on the secondary channel. Its duration is approximtely 10 seconds. When the tone is emitted by a remote modem, the central site will detect the SPACING condition for six hundred milliseconds and will transmit a modem power fail mayday with its address. If the modem is operating as a central site modem, its power fail output must be in digital format. In this event, relay contact $K_2$ applies the capacitor voltage to a pulse generator which provides a digital power fail signal of approximately seven seconds duration to an associated remote modem as modems 13 and 33 in FIG. 2.

Figure 8:
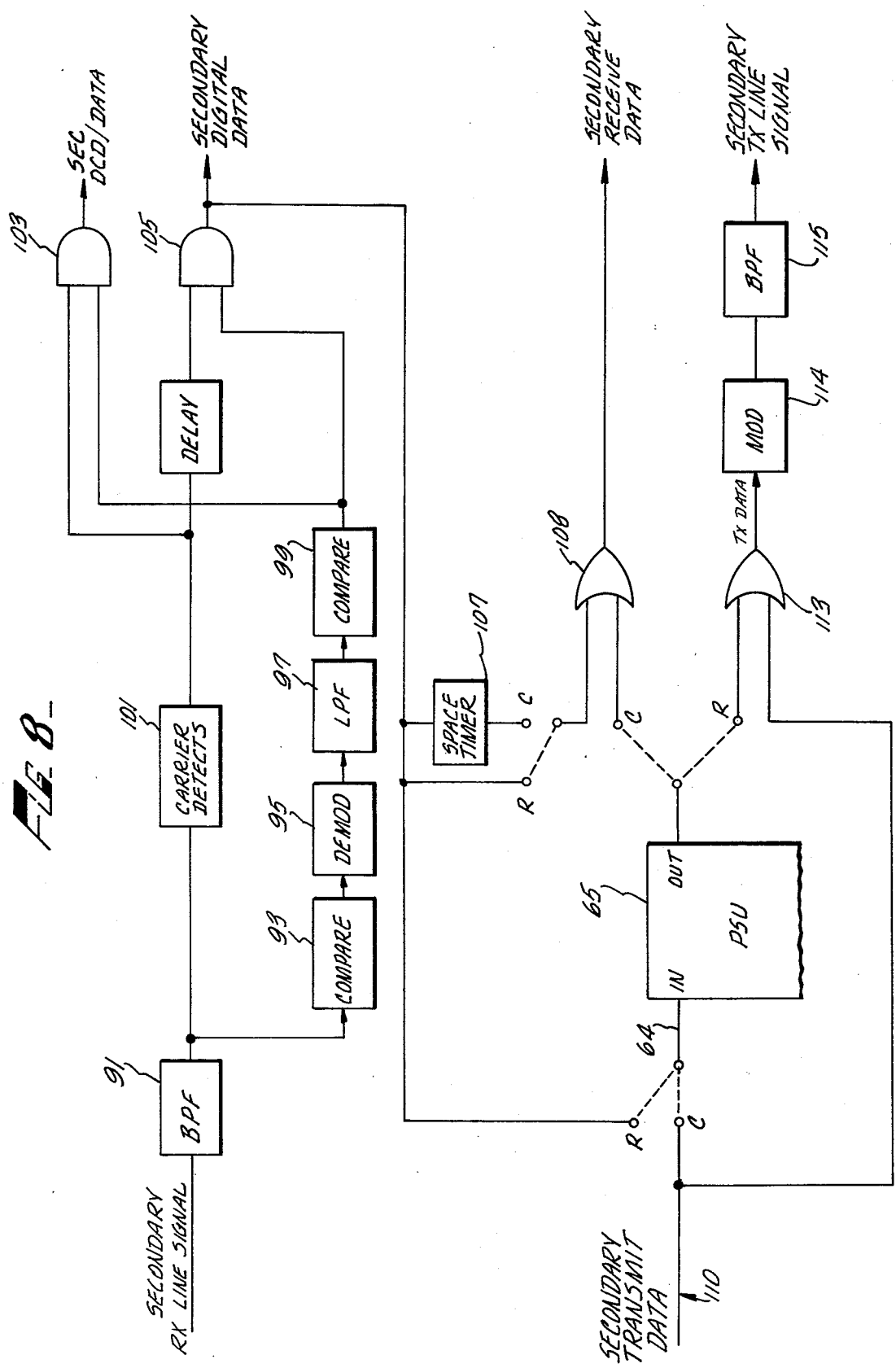
FIG. 8 is a circuit diagram of the power fail detect circuitry of the preferred embodiment.

FIG. 8 illustrates the preferred processing of the secondary channel receive and transmit signals. The receive line signal in analog form is first applied to a band-pass filter 91 with a center frequency of 420 Hz to separate the secondary channel from the main channel. The output of the band-pass filter 91 is sliced by a comparator 93 and supplied in digital format to the demodulator 95. In actual implementation, the FSK digital demodulator 95 is preferably formed as part of the associated modem digital LSI circuitry. The output of the demodulator 95 is applied to a post filter 97, which is a low-pass filter centered at 130 Hz. The output of the low-pass filter is applied to a second comparator 99, the output of which is secondary channel demodulated data. The secondary channel carrier is detected by a carrier detect circuit 101 which provides a positive indication when the level of the secondary channel signal exceeds a fixed threshold and which outputs a carrier detect signal to an AND gate 103. The other input to the AND gate 103 is the output of the second comparator 99. The output of the AND gate 103 is secondary channel received data which is supplied to the input terminal $A_7$ in FIG. 4 for power fail detection. The output of the demodulator is gated with carrier detect so that secondary receive data is changed to an off condition when the modem is not receiving secondary carrier. The output of the second comparator 99 and a delayed form of the carrier detect signal are applied to a second AND gate 105. AND gate 105 accomplishes the same function as AND gate 103.

In remote modem, the output of the AND gate 105 is otuputted to the receive data input 64 of the microprocessor and to the secondary channel receive data OR gate 108. In the central site mode, the ouput of the AND gate 105 is applied to a three hundred millisecond space inhibit timer 107 and from there, supplies a demodulated secondary channel receive data output through the OR gate 108 for the system controller 15. If the processor 65, 67 is at a central site, the output of the OR gate 108 is the message output of the processor. The receive data to the microprocessor is supplied by the secondary transmit data input 110 in the central site modem. The 300 millisecond space inhabit timer limits the propagation of the power fail space tone to a single tier of the network.

At remote sites, the message cut of the microprocessor is applied to a digital modulator 114, preferably on the modem LSI chip, and then to a band-pass filter 15 for transmission across the transmission line channel. If the modem is a central site, digital data from the system controller 15 is also applied to the modulator 114 through an OR gate 113 for transmission to remote sites.

Figure 9:
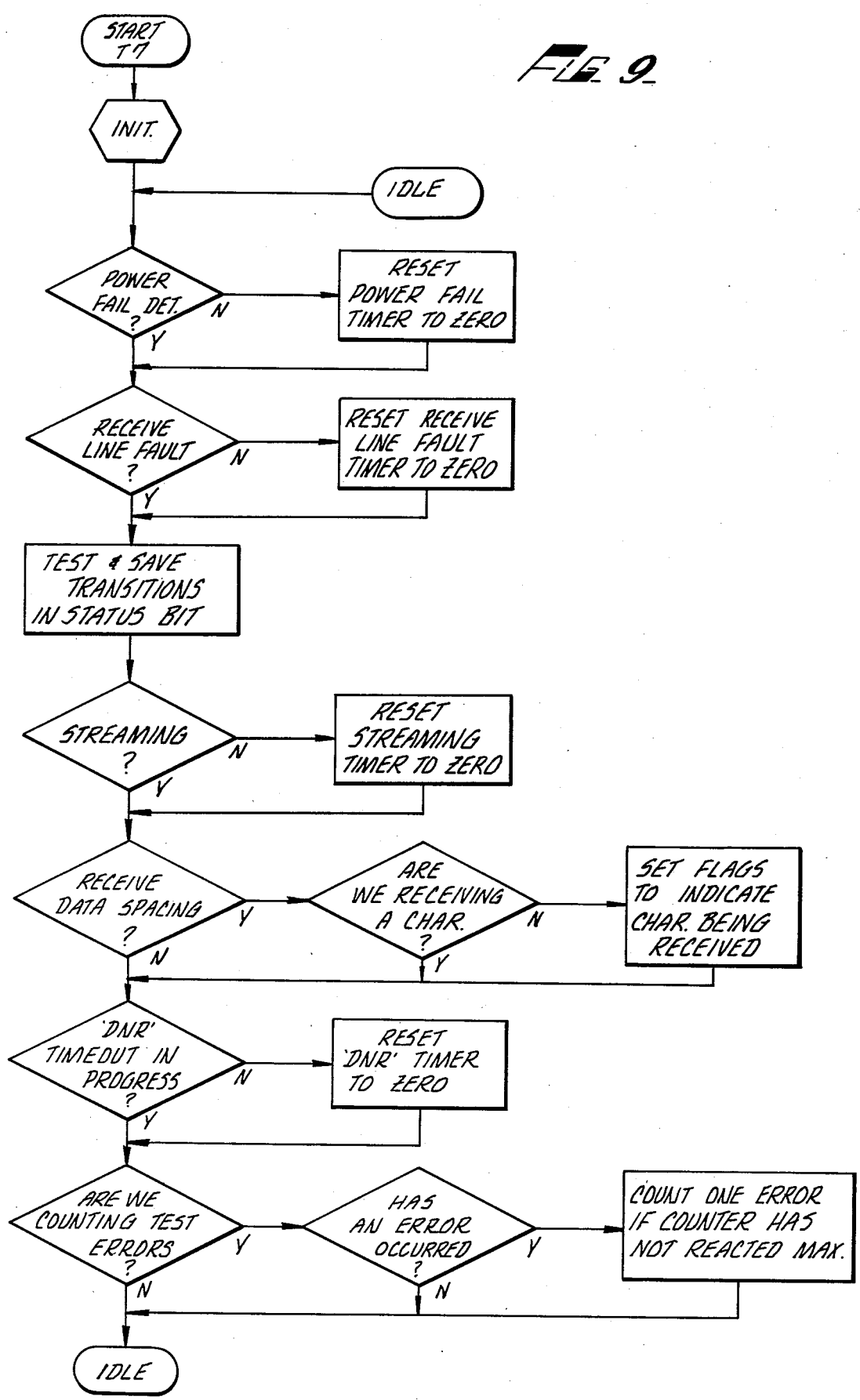
FIGS. 9–21 are flow diagrams illustrating the operation of the test and control unit.

The operation of the processor 65, 67 is illustrated in the Flow Diagrams 9–21. As shown in FIG. 9, the processor normally runs in an idle loop, monitoring various system parameters. First, the processor tests the power failure indication and receive line fault indication and resets respective timers if no alarm condition has been detected. The processor then tests and saves transitions in relevant status bits. Next, the streaming indication is checked and a timer reset if no streaming condition is indicated. The next test in FIG. 9 is for data spacing. If data spacing is detected, subsequent reception of a character is indicated. When a start bit is detected, flags are set to indicate character reception. Once the start bit has been detected, a character will then be received. Next, if a DNR time-out is not in progress, the DNR timer is reset to zero. If a DNR time-out is in progress, the timer is allowed to run and the next step is performed. In this step, the counting test errors condition is checked. If errors are being counted, and an error has occurred, a counter is incremented. The idle loop is then repeated.

Figure 10:
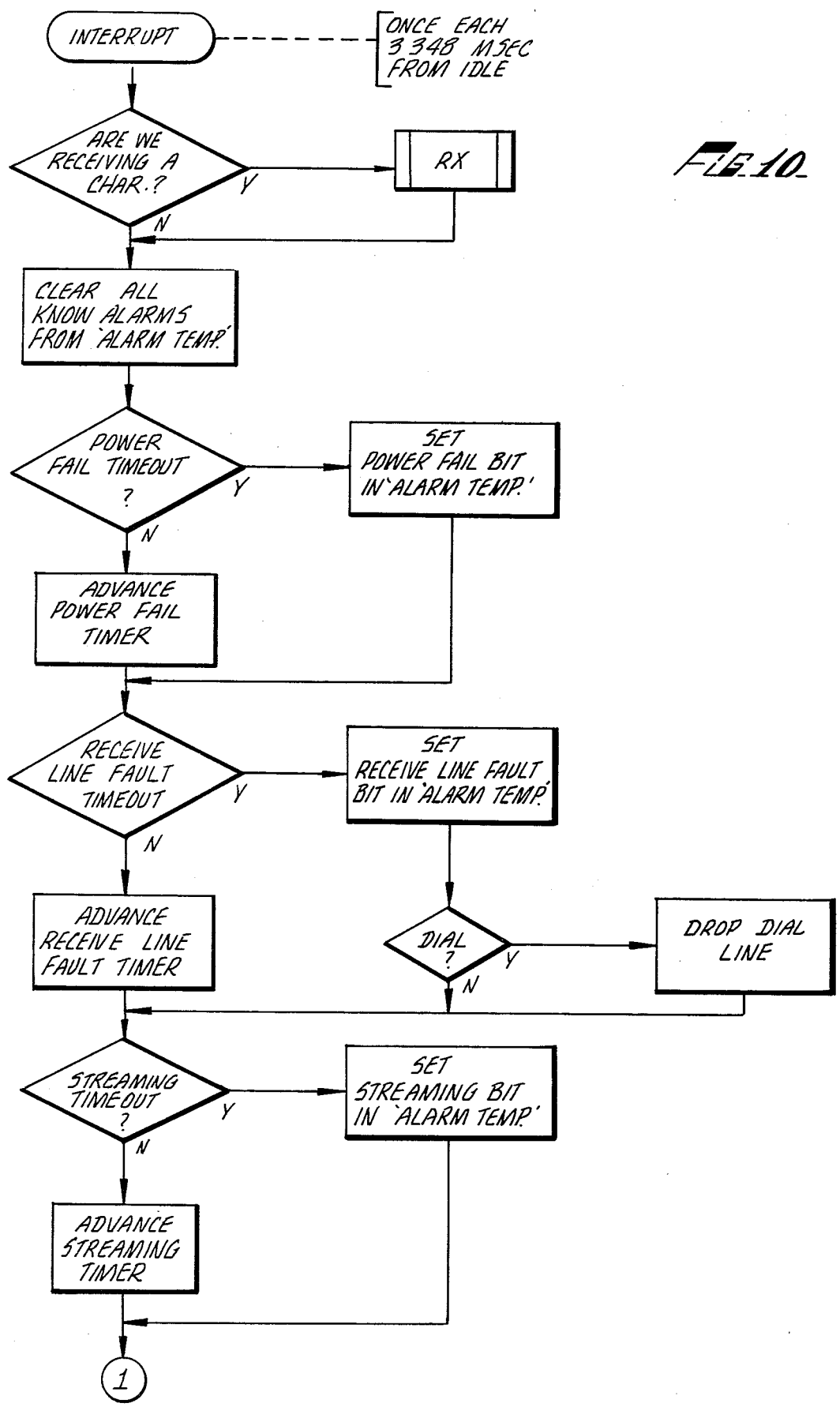

Every 3.348 milliseconds, an interrupt from idle occurs, as illustrated in FIG. 10. The time 3.348 milliseconds is set to enable sampling in the middle of each receive bit at the highest baud rate. At 75 BPS, four clocks per bit time are provided.

The first test in the interrupt chain is to ascertain if a character is being received according to the flags set during the idle loop. If so, the processor jumps to the routine indicated in FIG. 12. If not, the alarm conditions in a temporary alarm storage register are cleared and a number of alarm conditions then monitored. The power failure time-out is monitored; and if a time-out has occurred, a power fail bit is set in the temporary alarm storage register. If not, the power fail timer is advanced and a test for receive line fault time-out is made. If a receive line fault time-out has occurred, the receive line fault bit in the alarm register is set and a check for dial mode is made. If the modem is in the dial mode, the processor instructs that the dial line be dropped. If a receive line fault time-out has not occurred, the receive line fault timer is advanced and the next test is made. In this test, the streaming time-out indication is monitored. If a streaming condition has occurred, the streaming bit in the temporary alarm storage register is set. If not, the streaming timer is advanced and the flow proceeds to FIG. 11.

Figure 11:
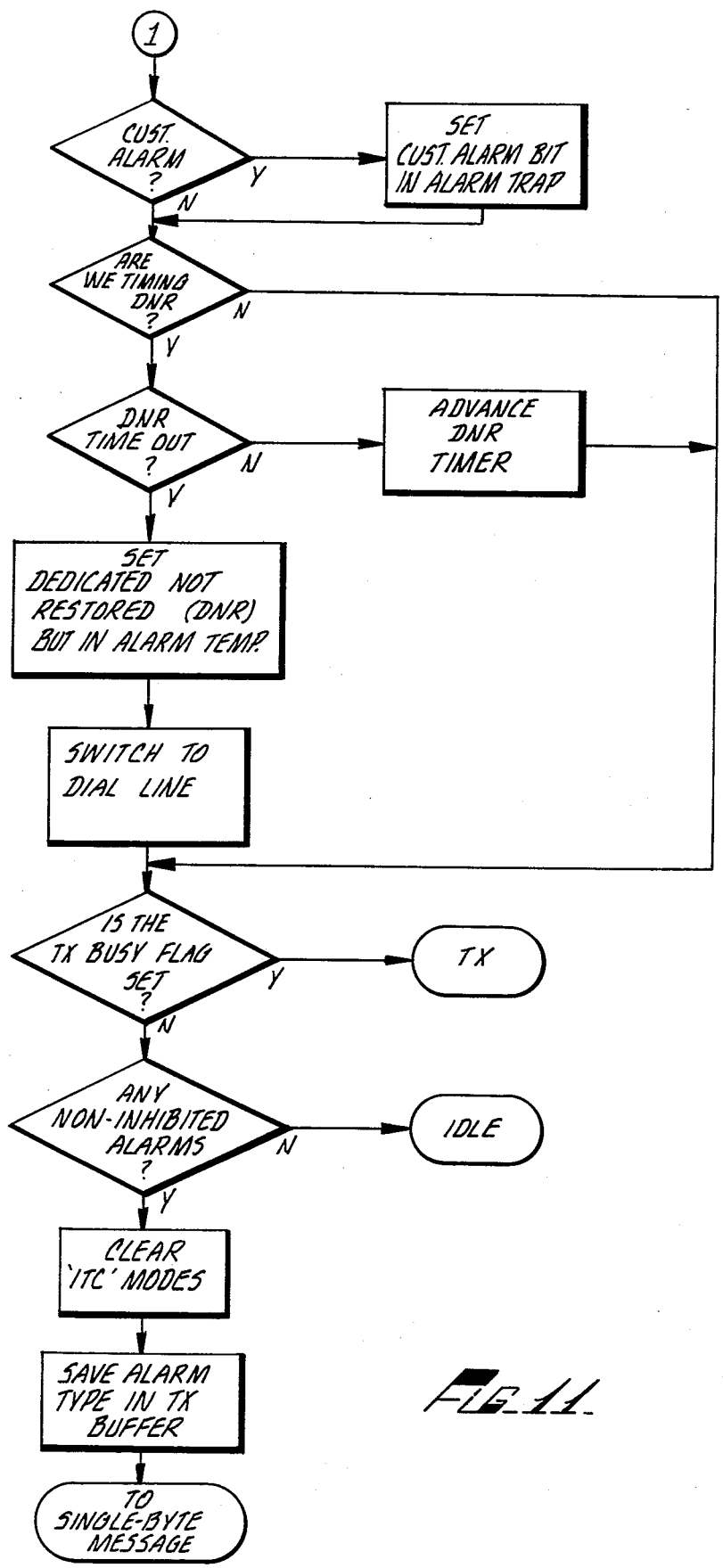

In the flow of FIG. 11, a test for a customer alarm condition is made, and the customer alarm bit in the temporary storage register is set if necessary. Next, a test for DNR timing is made. If DNR is timed out, the processor sets the DNR bit in the alarm storge register and produces an output control signal causing a switchback to the dial line.

Figure 12:
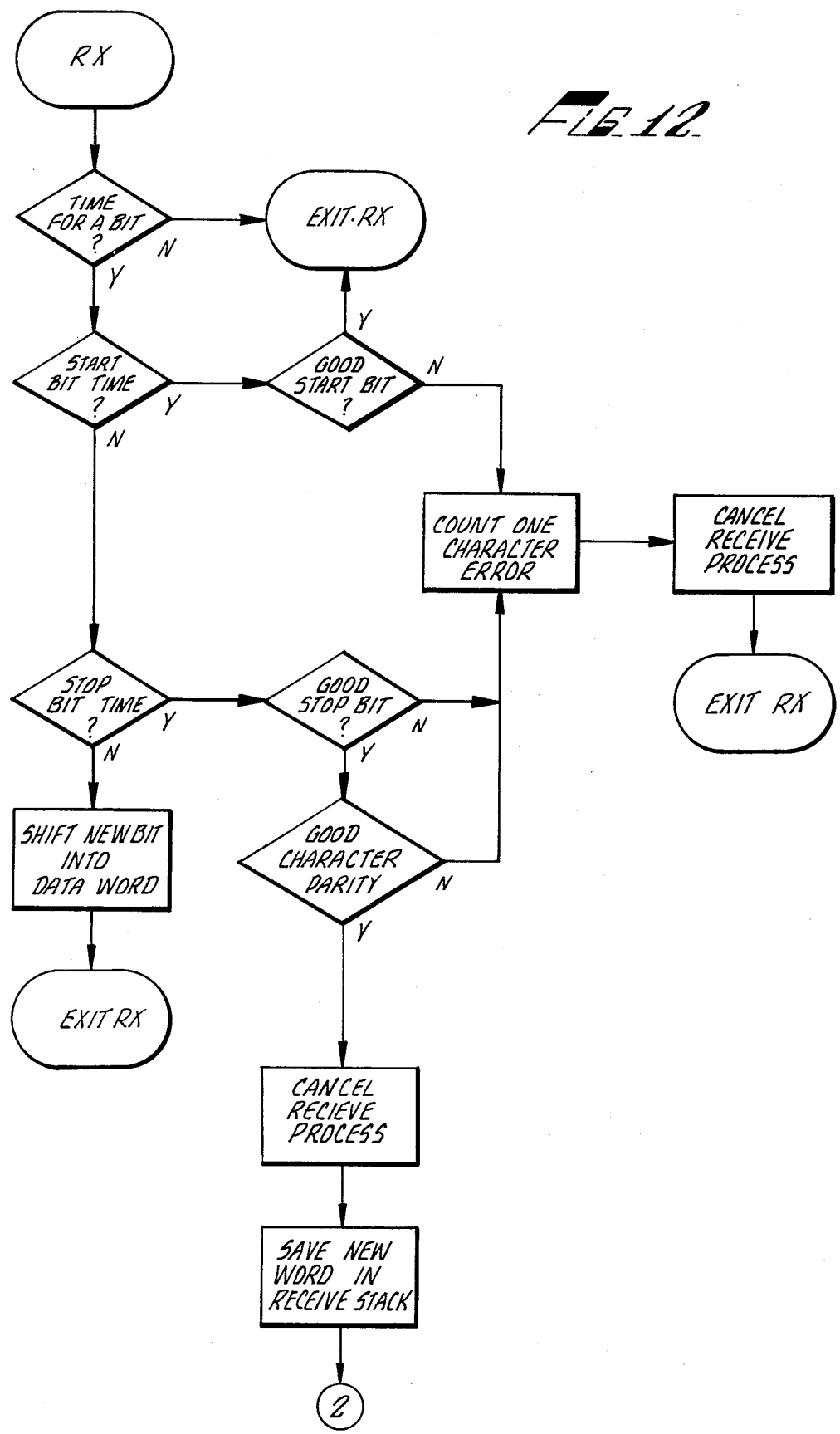

Next, a flag is examined to indicate whether a message transmission is required. If so, the flow of FIG. 15 is performed. If not, a test is made to indicate whether any alarms have been set. If no alarms have been set, the idel condition is reentered. If alarms have been set, it is necessary to send an alarm message back to the Central System Controller 15, if the alarm condition is not one which has been inhibited by a received RSI command. In such case, the ITC mode is cleared and the alarm type is saved in a transmit buffer. The program then proceeds to the flow of FIG. 14 for configuring a single data byte message. If the receipt of a character is detected according to Flows 9 and 10, the receive process of FIG. 12 is entered. This process is controlled by a programmable counter in the PSU 67, which resynchronizes upon the transition which indicates beginning of a start bit. The counter operation upon an input message is illustrated in FIG. 22. The first test in FIG. 12 examines the count of the programmable counter to determine if it is time to detect a bit. If not, the RX routine is exited back to the flow of FIG. 10. If it is time for a bit, the next test is to detect if it is time for a start bit. This detection is made by utilizing a second counter which decrements on each sampling interval and is idle during stop bits. The count of 10 indicates a start bit and count of 1 indicates the last bit. Sampling occurs at the mid-point of each bit time. If it is time for a start bit, a test is made to determine if the start bit is good, and an error is counted if it is not good. It it is not time for a start bit, a test is made to see if it is time for a stop bit. It it is time for a stop bit, the quality of the stop bit is again ascertained. If the stop bit is proper, a parity check is then made on the entire message word, and if the parity is good, the receive process is cancelled, saving the new word in a receive stack. If it is not time for a stop bit, the new bit is sampled, detected, and shifted into a register storing the current data word. The receive routine is then exited.

Figure 13:
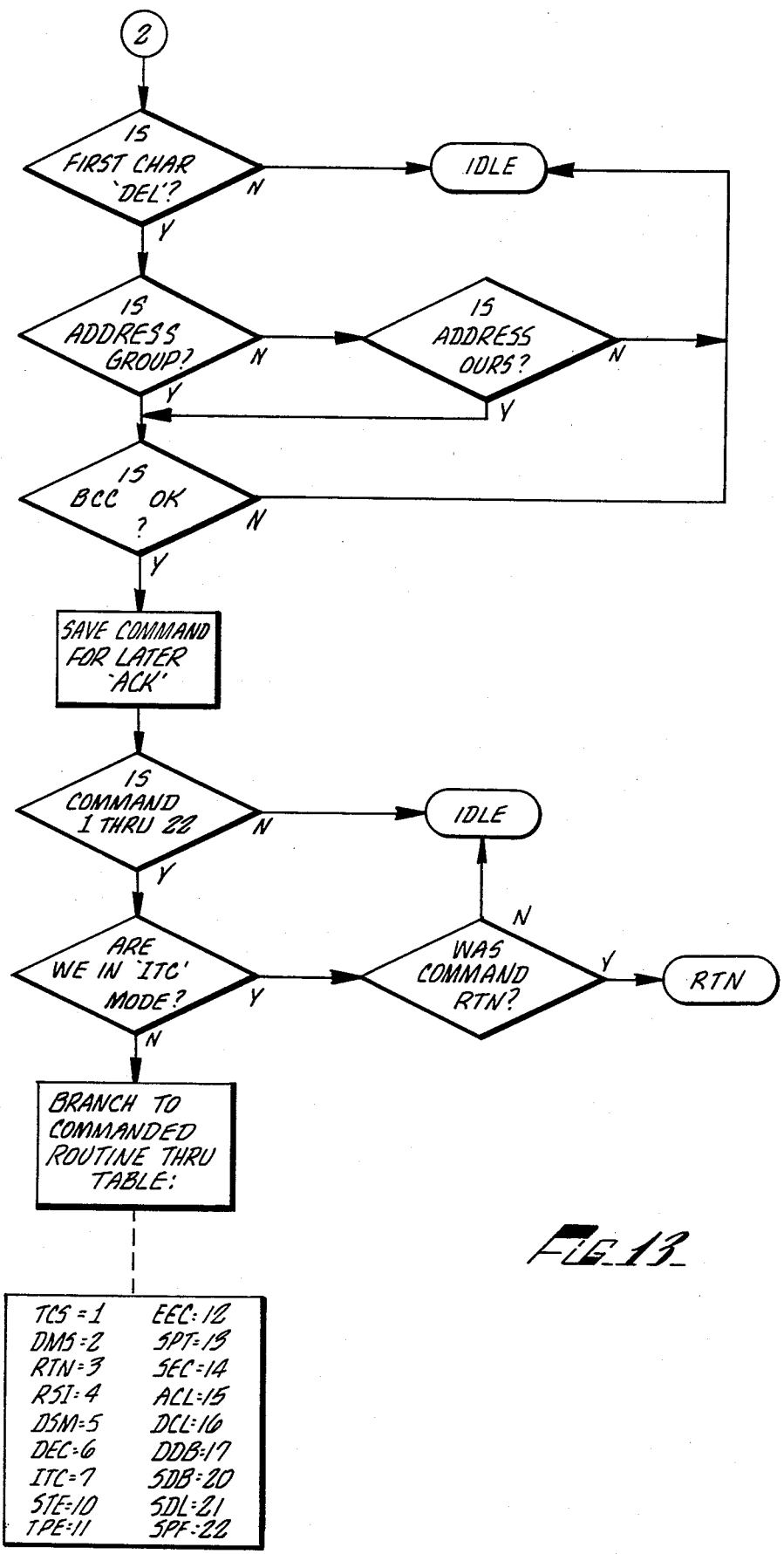

If a new word was saved in a stack according to the flow of FIG. 12, the flow of FIG. 13 is entered. The received characters are stacked successively with the first received character being shifted successively upward in the stack as additional characters are received. Thus, the first step in FIG. 13 is to check the top of the stack (the oldest character position) to determine if it is a "DEL" character. If so, a complete message possibly has been received. If not, the process enters the idle mode. If DEL has been detected at the top of the stack, the next test is to ascertain if the address is a group address. If not, the address is tested to ascertain if it is the address of the microprocessor under discussion, as set by the address bits $AD_0 \ldots AD_7$. If the address is improper, the processor returns to the idle mode. If the address is correct, the processor checks the Block Check Character (BCC). If the Block Check Character is proper, the command number is saved for a later Acknowledge operation according to flow 14. The command is then examined to determine if it is a member of the permissible command set. If it is not, the process returns to the idle mode. If the command is a proper command, a test is made to ascertain if the processor is in the ITC mode. If not, the processor branches to the commanded routine through a table, as indicated.

Figure 14:
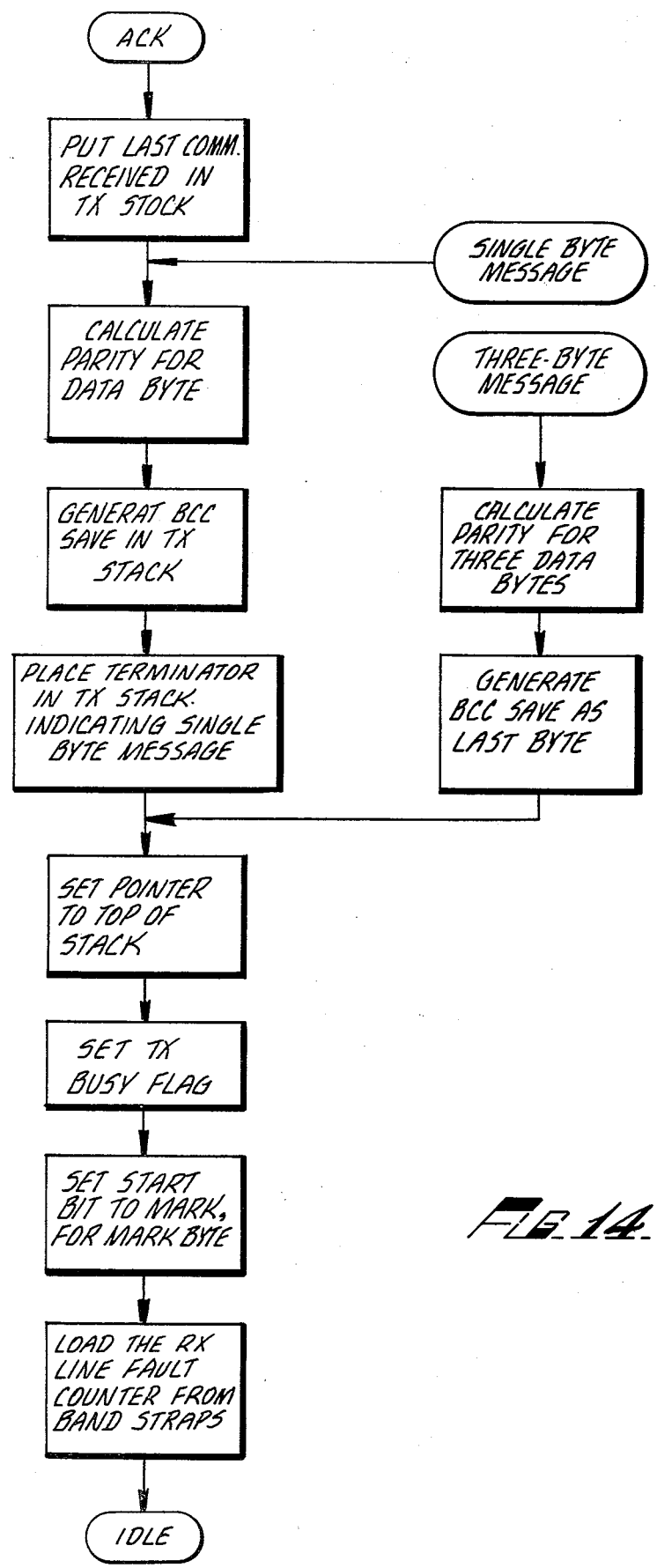
Figure 15:
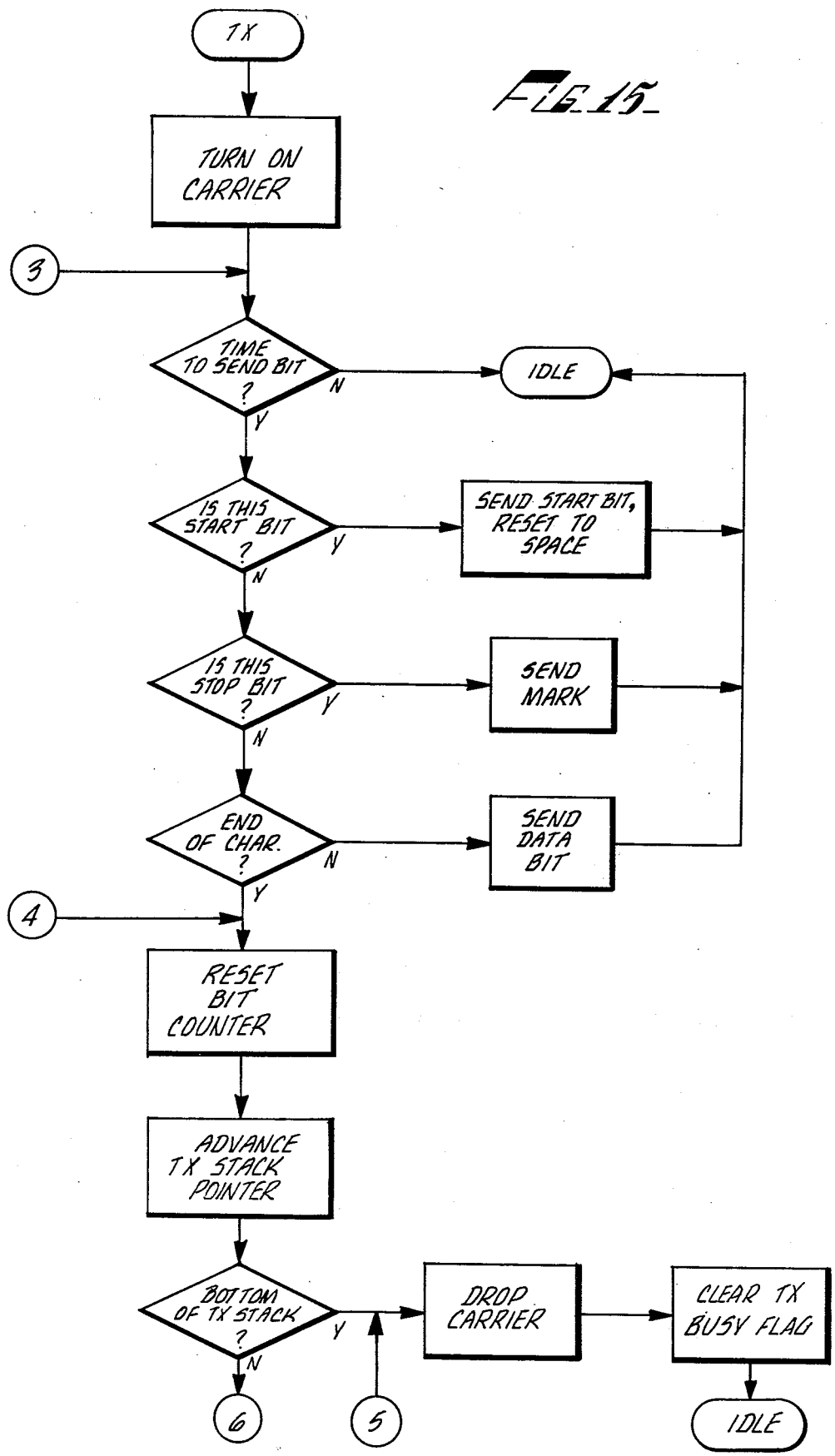

FIG. 14 illustrates the Acknowledge procedure. The command number saved during the flow of FIG. 13 is placed in the data byte location of the transmit stack. Parity is then calculated for the data byte, and the Block Check Code is generated and saved in the transmit stack. In the case of a single data byte message, a terminator is placed in the transmit stack to indicate a single data byte message. A pointer to the top of the stack is then set to indicate the next character to be transmitted, and the "transmit busy" flag is set. Setting of the transmit busy flag will cause the flow of FIG. 11 to branch to the transmit routine of FIG. 15. If a mark byte is to be sent, the start bit is set to mark. This causes a character to be transmitted which substitutes a data mark bit where the start bit would normally occur. Parity for a character containing all ones is also a one (mark), resulting in a continuous mark-hold condition for the duration of one character time. This delays the second character, a sync byte, until the corresponding receiving circuit can detect the mark hold and prepare to receive without missing any bits. The start bit is then reset to space to allow normal transmission of subsequent characters. The receive line fault counter is then loaded to time the sending of the RLF alarm and the processor returns to the idle mode.

When the processor enters the transmit mode, FIG. 15, secondary channel carrier is turned on. A counter is again used to time the transmission of the message, which is stored in a transmit stack. First, a test is made to determine if it is time to send a bit. If not, the idle mode is re-entered. The count is then examined to determine if it is time for a start bit. If yes, the start bit is sent. If not, a test is made to determine if it is time to send a stop bit, and if so, a mark is sent. If it is not time for a start bit or a stop bit, a test is made to determine if the end of the character being transmitted has been reached. If the end of a character has not been reached, a data bit is sent and the processor returns to the idle mode. If the end of a character has been detected, the bit counter is reset, the transmit stack pointer is advanced, and a test is performed to ascertain if the bottom of the transmit stack has been reached. If the bottom of the transmit stack has been reached, the carrier is dropped, the transmit busy flas is cleared, and the processor returns to the idle loop. If the bottom of the transmit stack has not been reached, the flow of FIG. 16 is performed.

Figure 16:
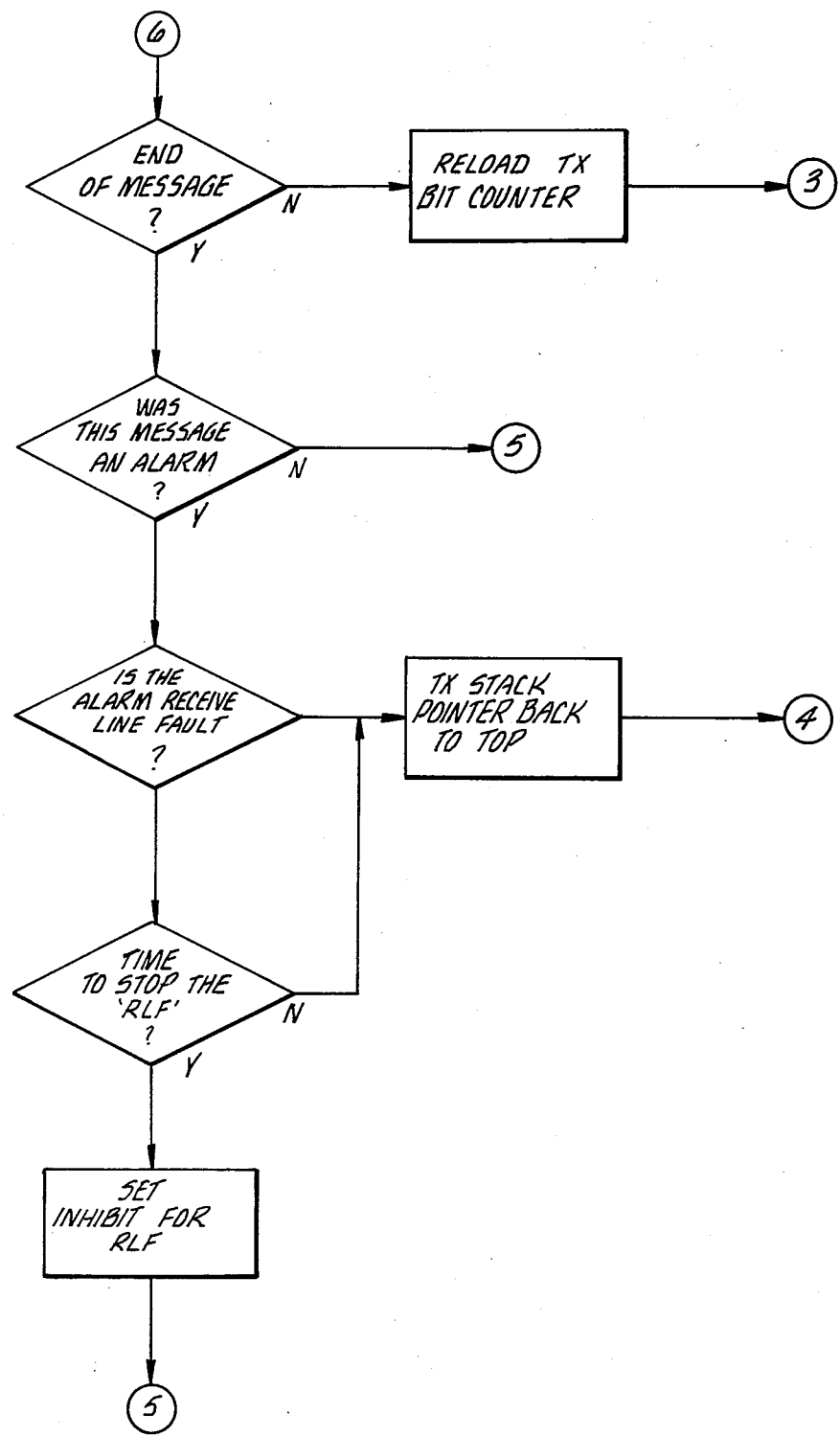

In the flow of FIG. 16, if the end of the message has not been reached, the transmit bit counter is re-loaded and the flow of FIG. 15 is re-entered. If the message is at an end, a test is made to determine if the message was an alarm message, which is repeatedly sent. If it was not, the flow of FIG. 15 is re-entered at point 5. If the message was an alarm message, a test is made to ascertain if it was a receive line fault alarm, which times itself out. If not, the transmit stack pointer is set back to the top of the stack and the flow of FIG. 15 is reentered at 4. If the alarm was a receive line fault, a test is made to determine if the time for transmission of the RLF has expired. Normally 10 seconds of transmission. Varies ±two seconds depending on $T_7$ buad rate. It so, the RLF signal is inhibited and the flow of FIG. 15 is reentered at point 5.

Figure 17:
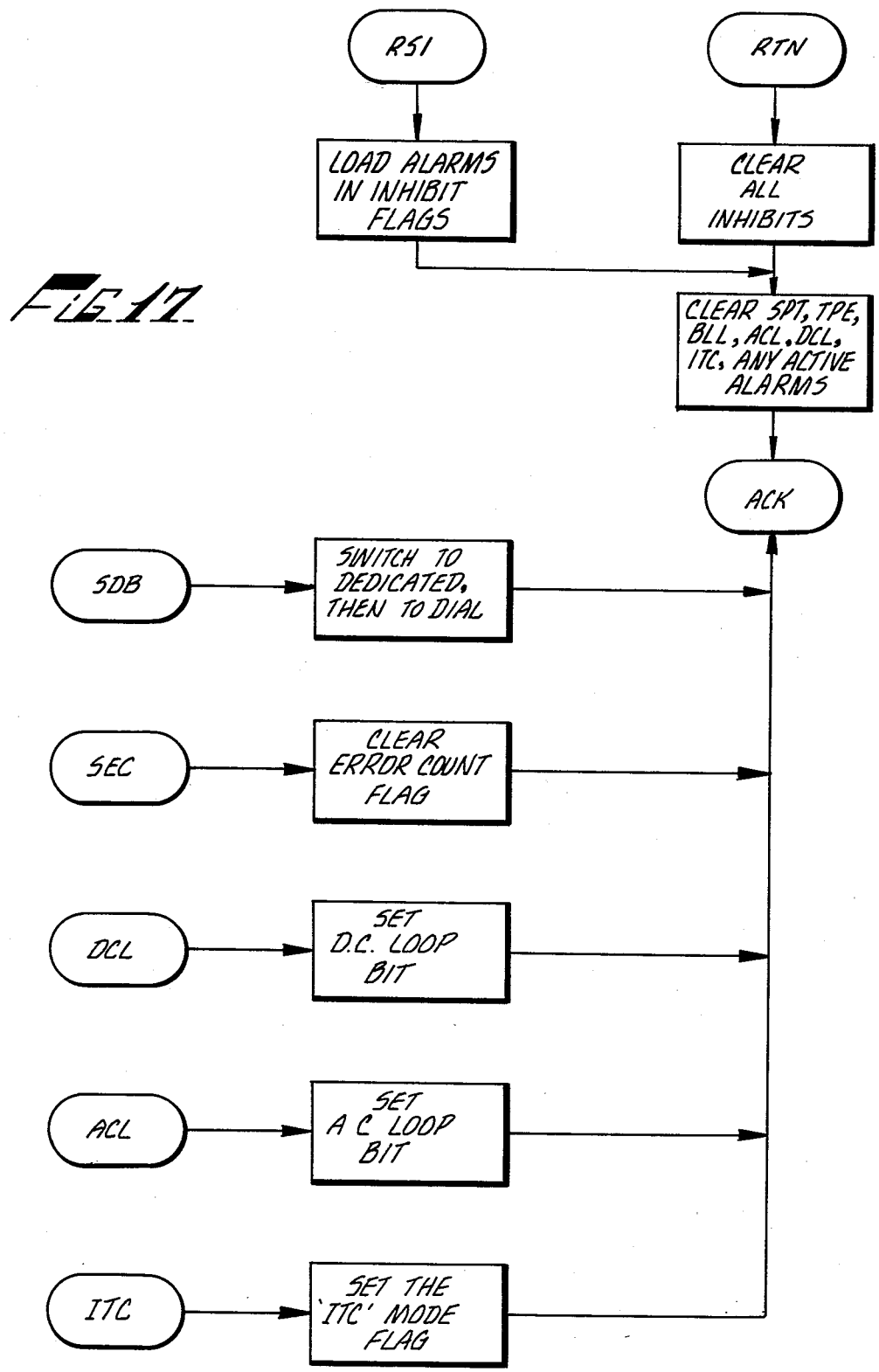

The flow of FIG. 17 indicates the response of the processor to commands which are acknowledged by the processor. In response to an RSI command, any alarms are loaded from temporary alarm storage to the mayday inhibit flags. In response to an RTN command, all mayday inhibits are cleared. The SPT, TPE, BLL, ACL, DCL, and any active alarms bits are cleared as well as ITC mode, (Not a bit) before returning to the Acknowledgement flow. The SDB command sets a bit which causes the modem to switch back to the dial back-up lines. The SEC command clears the error count flag. The DCL command sets the DC loop control bit, and the ACL command sets the AC loop control bit. The ITC command sets a flag indicating the ITC mode. All of these commands then return to the Acknowledge flow of FIG. 14.

Figure 18:
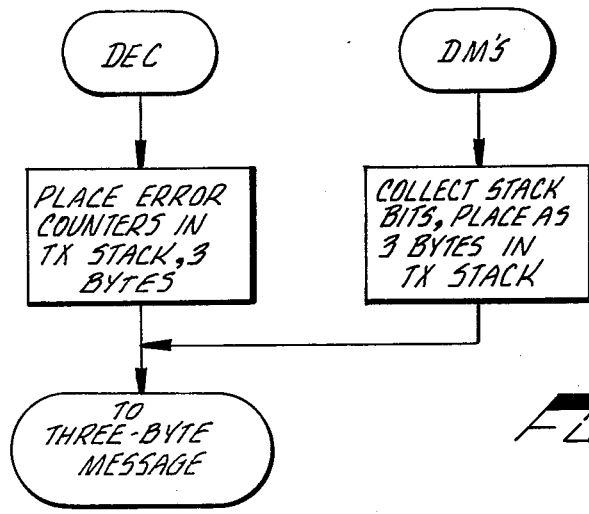

FIG. 18 illustrates the performance of the DEC and DMS commands, which require the processor to configure a 3-data byte message. For the DEC command, the error counters are placed in the transmit stack. For the DMS command, the status bits are collected and placed in the transmit stack. The flow then returns to the 3-byte message entry point of FIG. 14.

Figure 19:
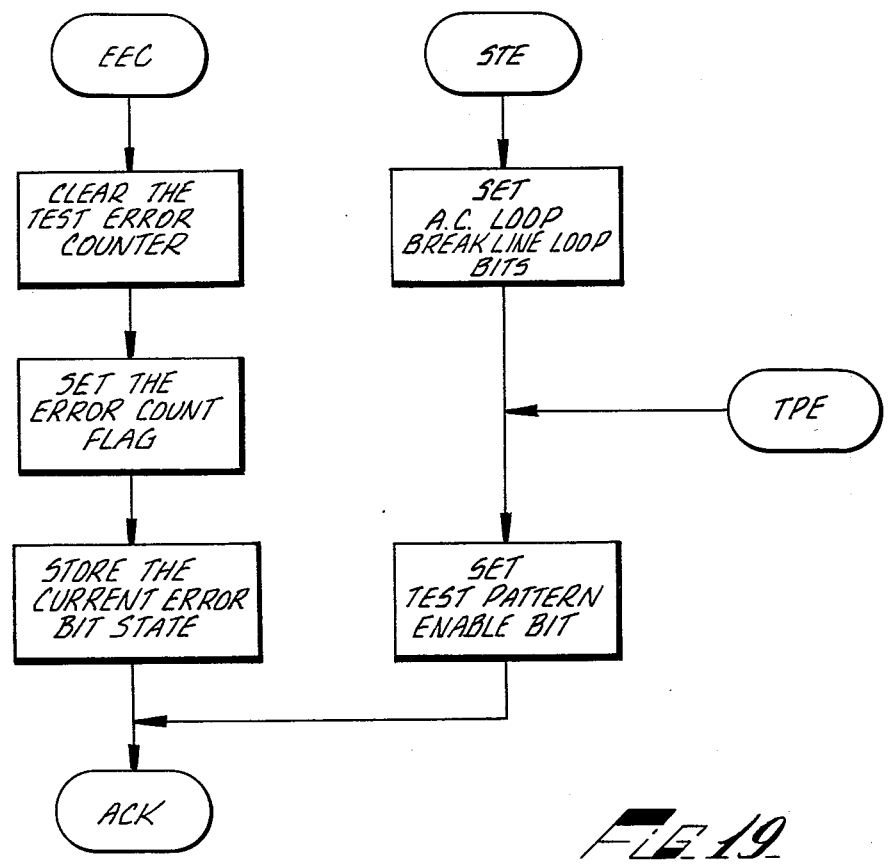

The flow of FIG. 19 illustrates the performance of the EEC, STE, and TPE commands. In response to the EEC command, the test error counter is cleared. The error count flag is set and the current error bit state is stored. In response to the STE command, the AC loop and break line loop bits are set and the test pattern enable bit is set. Acknowledgement is then provided by reverting to the flow of FIG. 14.

Figure 20:
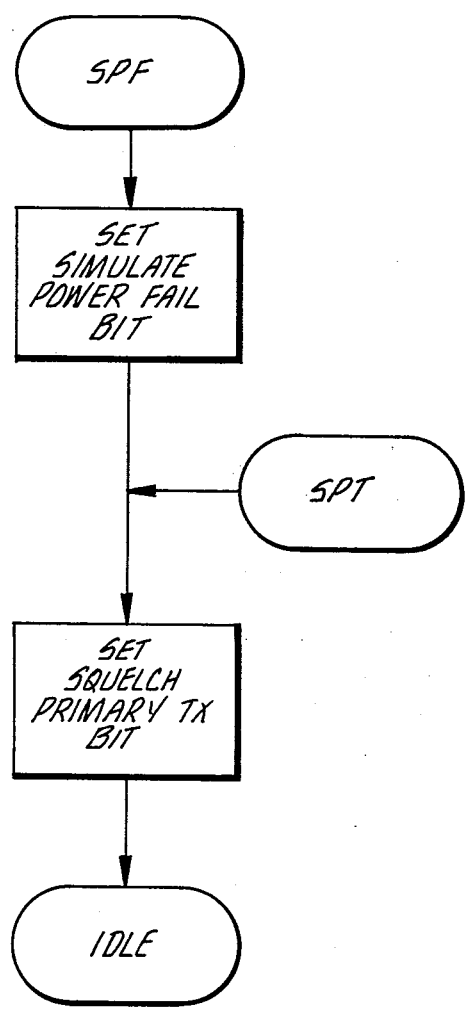

FIG. 20 illustrates the SPP and SPT commands. It may be noted that this flow 20 returns to the idle state and no Acknowledgement is provided.

Figure 21:
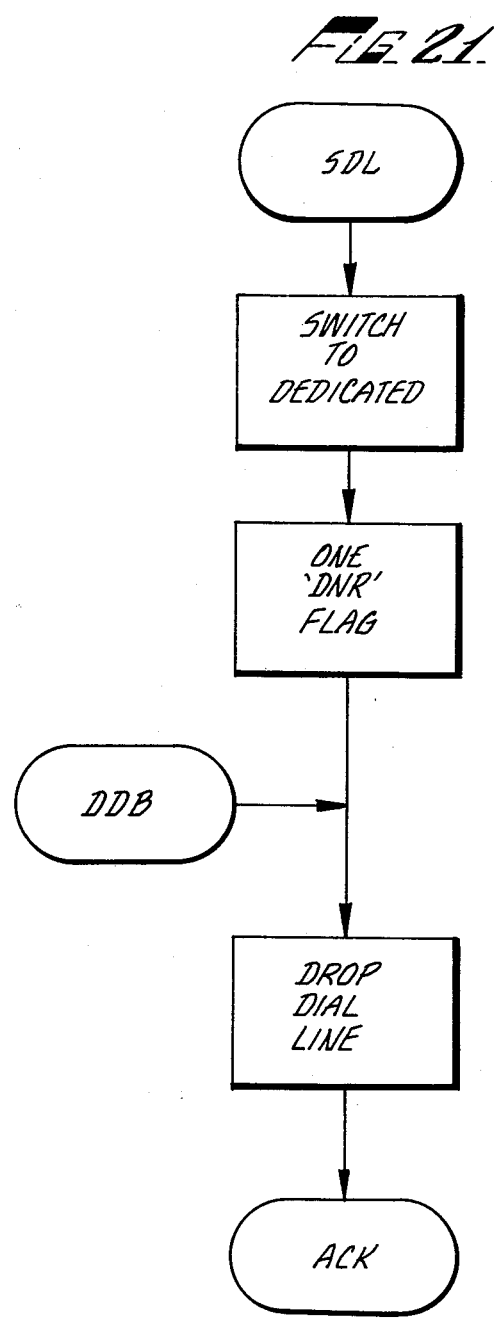

FIG. 21 illustrates performance of the SDL and DDB. In response to SDL, a control bit is set to cause the switch to dedicated lines and the DNR flag is set to start time-out for the DNR mayday. The next step is responding to the SDL command and the only step in responding to the DDB command is to drop the dial line and return to the Acknowledgement routine.

As may be appreciated the many features of the just described preferred embodiment are subject to numerous modifications and adaptations without departing from the scope and spirit of the invention. It is therefore to be understood that, within the scope of the appended claims, the invention may be practiced other than as specifically described above.

What is claimed is:

1. For use in a modem system including a central site modem and at least one remote site modem communicating over a transmission line with said central site modem, the modem diagnostic apparatus comprising:
a central site processor means for providing commands including a plurality of test commands;
means associated with said central site modem for receiving test commands from said central site processor, for checking, autonomously of said central site processor, for alarm conditions at the associated central site modem and informing said central site processor of a said alarm condition, and for transmitting communications between said central site processor and the remote site modem; and
means associated with said remote site modem for receiving test commands transmitted by said central site modem from said central site processor, for checking, autonomously of said central site processor, for alarm conditions at said remote site modem and for transmitting an alarm message back to said central site modem.

2. The modem diagnostic apparatus of claim 1 wherein said means associated with said central site modem includes a programmed processor and wherein said means associated with said remote site modem includes a programmed processor.

3. The modem diagnostic apparatus of claim 1 or 2 wherein said alarm conditions include a streaming condition indicating utilization and a transmission channel for an excessive period of time and an indication of a failure in the operation of a modem, and wherein said alarm message includes information as to the type of location of the alarm condition.

4. The modem diagnostic apparatus of claim 1 wherein said modem system further includes a second tier network including at least one remote central modem and wherein said apparatus further includes means for enabling said remote site modem to exchange communications with said at least one remote central modem, said communications including commands transmitted through said remote site modem and said central site modem from said central processor.

5. The modem diagnostic apparatus of claim 4 wherein said at least one remote central modem has operatively associated therewith means for receiving a test command transmitted through said central site modem and said remote site modem from said central site processor and for autonomously monitoring for alarm conditions at said at least one remote central modem and transmitting an alarm message back to said remote site modem for transmission to said central site processor.

6. The modem diagnostic apparatus of claim 1 wherein one of the alarm conditions at a remote site is a streaming condition, indicating utilization of said transmission line for an excessive period of time.

7. The modem diagnostic apparatus of claim 1 wherein one of the alarm conditions at said remote site modem is a modem power failure indication.

8. The modem diagnostic apparatus of claim 1 wherein one of the alarm conditions at said remote site modem indicates a fault in the receive line of said remote site modem.

9. The modem diagnostic apparatus of claim 1 wherein said modem system includes back-up and dedicated communication lines, means for connecting said remote and central site modems alternately between said back-up and dedicated lines, and wherein one of the alarm conditions indicates that a failed dedicated line has not been restored to working condition.

10. The modem diagnostic apparatus of claim 1 wherein one of the alarm conditions is customer-provided.

11. The modem diagnostic apparatus of claim 1 wherein said modem system further includes a dedicated communication line, a back-up line, and means for alternately switching the communication path of said remote site and central site modems between said back-up line and said dedicated line, and wherein said modem diagnostic apparatus further includes:
means for holding said back-up line while a switch to said dedicated line is performed;
means for ascertaining the performance of the dedicated line once the dedicated line has been switched to; and
means for automatically switching back to the held back-up line if said performance is not satisfactory.

12. The apparatus of claim 1 wherein said alarm messages and test commands are transmitted over a secondary channel.

13. The apparatus of claim 12 wherein said test commands are received in a format including a plurality of words, each word containing a start bit, two stop bits, a parity bit and one of a plurality of information characters, said information characters including a command character and an address.

14. The modem diagnostic apparatus of claim 12 wherein one of said commands is an inhibit command indicating that said secondary channel is to be used for customer data transmission and wherein said first and second means are responsive to said inhibit command to allow said secondary channel to operate as a customer data channel.

15. The modem diagnostic apparatus of claim 1 wherein said central processor means includes means for selectively addressing a command to a particular one of the central site and remote site modems.

16. The modem diagnostic apparatus of claim 1 wherein said modem system includes a plurality of central site modems, each communicating with at least one remote site modem and wherein said central processor means further includes means for transmitting a group address, said group address identifying a central site modem and all of the remote modems branching therefrom.

17. The modem diagnostic apparatus of claim 16 further including means for automatically identifying which remote site modems are operating through a given central site modem.

18. Apparatus for testing and controlling a modem in response to commands, including test commands, from a control source comprising:
means at said modem for receiving said commands;
means at said modem for transmitting messages to said control source;
and means at said modem supplied with said commands by said receiving means for testing said modem in response to said test commands, monitoring the performance of said modem for alarm conditions, and supplying alarm messages to said transmitting means if an alarm condition is detected, said monitoring and supplying being done autonomously of said control source.

19. The apparatus of claim 18 wherein said means supplied with said commands comprises a programmed microprocessor.

20. A test and control unit for use in conjunction with a data modem comprising:
means for detecting a plurality of alarm conditions in the operation of said modem and setting corresponding alarm bits;
means for receiving a formatted message, including a plurality of words each of which contains an information portion, one of which portions is a command, and for storing the received information portions in a stack;
means for checking the contents of the stack to verify correct receipt of a command and for setting control bits to effectuate a command if said contents are correct;
means for formatting and storing an acknowledgement message in response to detection of an alarm condition by said detecting means or in response to a correctly received command; and
means for transmitting a said acknowledgement message out of said test and control unit.

21. A test and control unit for use in conjunction with a data modem comprising:
means for detecting a plurality of alarm conditions in the operation of said modem and setting corresponding alarm bits;
means for receiving a formatted message, including a plurality of words, each word including start, stop, and parity bits and an information character one of which characters may comprise a command and for detecting said start and stop bits, checking the parity condition and storing the received character in a character stack;
means for checking the contents of the character stack to verify correct receipt of a command and for setting control bits to effectuate a command if said contents are correct;
means for formatting and storing an acknowledgement message in response to detection of an alarm condition by said detecting means or in response to a correctly received command; and
means for transmitting a said acknowledgement message out of said test and control unit.

22. In a data modem adapted to be switched between back-up and primary transmission lines and adapted to receive command signals from a central controller, the apparatus comprising:
means responsive to a first command from said central controller to switch from said back-up line to said primary line for timing an interval during which a second command is expected to be received from said central controller and for switching said modem back to said back-up line if said second command is not received during said interval.

23. The apparatus of claim 22 wherein said means also transmits an alarm signal to said central controller if said second command is not received during said interval.

24. The apparatus of claim 23 wherein said back-up line is a dial back-up line.

25. Apparatus for testing and controlling a modem in response to commands from a control source comprising:
means for receiving said commands;
means for transmitting messages to said control source;
and a programmed microprocessor supplied with said commands by said receiver means for testing said modem in response to test commands, autonomously monitoring the performance of said modem for alarm conditions, and supplying alarm messages to said transmitting means if an alarm condition is detected.

26. In a data modem, diagnostic apparatus adapted to communicate with a central controller means for providing a plurality of commands to said diagnostic apparatus, said diagnostic apparatus comprising:
means for providing a plurality of signals from which a plurality of alarm conditions may be detected; and
means including a programmed processor for monitoring said plurality of signals autonomously of said central controller and for detecting from said plurality of signals a plurality of alarm conditions, storing digital indications of the presence or absence of said alarm conditions, and autonomously forming an alarm message for transmission to said central controller upon detection of the presence of a said alarm condition.

27. The diagnostic apparatus of claim 26 wherein said means including a programmed processor further autonomously maintains and updates a register of a plurality of status bits indicative of various modem operating parameters and transmits said status bits to said central controller upon receiving a first command from said central controller.

28. The diagnostic apparatus of claim 26 or 27 wherein said means including a programmed processor is further responsive to receipt of a modem test command comprising a plurality of characters to store said characters in a stack, test said characters, perform the test indicated by the test command, format the results of the test and transmit said results to said central controller.

29. The diagnostic apparatus of claim 27 wherein said means including a programmed processor is responsive to said first command to transmit a first group of status bits and to a second command to transmit a second group of status bits.

30. The diagnostic apparatus of claim 26 wherein said data modem is adapted to be connected to means for switching between a primary line and a back-up line; wherein said central controller provides a first command to switch to said back-up line and a second command to switch to said primary line; wherein said means including a programmed processor is responsive to said first and second commands to cause said means for switching to switch between said primary and back-up lines; and wherein said means including a programmed processor is further responsive to said second command to time an interval during which a third command is to be received over the primary line and is responsive to the lack of transmission of said third command within said interval to switch back to said back-up line and send an alarm signal to the central controller indicating the primary line has not been restored.

31. The diagnostic apparatus of claim 30 wherein said means including a programmed processor is further responsive to detection of a line fault on a back-up line to switch said modem to the primary line and transmit an alarm signal to said central controller.

32. The diagnostic apparatus of claim 26 wherein said means including a programmed processor is responsive to a first of said commands to stop transmission of an alarm message and store an indication of the alarm condition detected.

33. The apparatus of claim 32 wherein said means including a programmed processor is further responsive to a second of said commands to transmit said indication to said central controller.

34. The apparatus of claim 33 wherein said central controller includes means to automatically detect interference of an alarm message with another transmission and to supply said second command to said modem.

35. Diagnostic apparatus for a data communication system including a plurality of data modems comprising:
means for providing to a first of said data modems a plurality of first signals from which malfunctions in said data communication system may be detected;
means located at said first data modem and operating at least in part under control of a program stored at said data modem for automatically detecting malfunctions from said first signals; and
means for generating a message signal containing information indicative of the occurrence of a malfunction in the data communication system.

36. The diagnostic apparatus of claim 35 wherein said data communication system includes a central site controller and wherein said diagnostic apparatus further includes means for transmitting said message signal to said central site controller.

37. The apparatus of claim 35 or 36 wherein said message signal contains information indicating the type or location of malfunction which has occurred.

38. The apparatus of claim 36 wherein said message is transmitted over a secondary channel to said central site controller.

39. In a data communication system including a plurality of data modems each at a remote site, the diagnostic apparatus at each said remote site comprising:
means for providing a first plurality of signals from which malfunctions in said data communication system may be detected;
means supplied with said first plurality of signals for repeatedly testing said signals and responsive to said tests for detecting said malfunctions; and
means responsive to detection of a said malfunction for generating a second plurality of signals, each indicative of the occurrence of a said malfunction.

40. The diagnostic apparatus of claim 39 further including means for generating a message including the location and type of a detected malfunction and transferring said message out of said diagnostic apparatus.

41. The diagnostic apparatus of claim 40 wherein said message is transferred to other apparatus within said modem.

42. The diagnostic apparatus of claim 40 wherein said message is transmitted through a secondary channel to a central location in said data communication system.

43. For use in a data communication system including a plurality of data modems, the diagnostic apparatus comprising:
means for providing a plurality of first signals from which faults in said data communication system may be detected, said faults including an indication of a failure in a said data modem and an indication of a streaming condition;
means contained within a said data modem and supplied with said first signals for automatically detecting from said first signals the occurrence of one or more of said faults and for generating a message including information indicative of the type of fault and the location of the fault in the data communication system; and
means for transmitting said message to a central site in said data communication system.

44. The apparatus of claim 43 wherein said means supplied with said first signals performs said automatic detection under control of a stored program.

45. The apparatus of claim 44 wherein said first signals are available within said data modem or at the interface of said data modem.

46. For use in a data communication system including a central site modem and at least one remote site modem communicating over a transmission line with said central site modem, the modem diagnostic apparatus comprising:
a central site processor means for providing commands including a plurality of test commands;
means associated with said central site modem for receiving test commands from said central site processor, for automatically and continuously checking under control of a microprocessor associated with said central site modem for system malfunctions at the associated central site modem, for informing said central site processor of a said malfunction, and for transmitting communications between said central site processor and the remote site modem; and means associated with said remote site modem for receiving test commands transmitted by said central site modem from said central site processor, for automatically and continuously checking under control of a microprocessor associated with said remote site modem for system malfunctions at said remote site modem and for transmitting a message back to said central site modem indicating a malfunction has occurred.

47. The diagnostic apparatus of claim 46 wherein said message indicates the location of said malfunction in said data communication system.

48. The diagnostic apparatus of claim 46 or 47 wherein said message further indicates the type of said malfunction.

49. For use in a data communication system including a plurality of remote sites and at least one remote site modem located at each remote site, a method of performing remote site diagnostics comprising the steps of:
providing a plurality of first signals from which malfunctions in said data communication system at a remote site may be detected;
monitoring said signals at said remote site to automatically detect said malfunctions, said monitoring and detecting being performed at least in part under control of a program stored at said remote site; and
generating a message signal containing information indicating that a malfunction has occurred in the data communication system.

50. The method of claim 49 wherein said message includes information indicative of the type of malfunction which has occurred.

51. The method of claim 49 wherein said message includes information indicative of the location of the malfunction.

52. The method of claim 51 wherein said message further includes information indicative of the type of malfunction which has occurred.

53. The method of claim 52 further including the step of transmitting said message over a secondary communication channel to a central location in said data communication system.

54. In a data modem, adapted for use as part of a data communication system including a central controller, the method of performing data communication system diagnostics comprising the steps of:
providing a plurality of signals from which a plurality of alarm conditions may be detected;
monitoring said plurality of signals under stored program control, autonomously of said central controller;
detecting alarm conditions from the monitored signals under stored program control, autonomously of said central controller;
storing digital indications of the presence or absence of said alarm conditions; and
responding to the detection of an alarm condition by forming a message indicative of the occurrence of a said alarm condition for transfer to selected apparatus in said data communication system.

55. The method of claim 54 wherein said message includes information indicating the type and location of said alarm condition.

56. Diagnostic apparatus for use in a data communication system at data modem sites comprising:
means for producing a plurality of first signals containing information concerning the operation of said data communication system; and
a microprocessor running in an idle loop wherein a plurality of said first signals are repeatedly checked, said microprocessor including a plurality of timers and means for resetting said timers if certain malfunctions have not been detected, and means for periodically interrupting said idle loop to check for character reception, to set bits in a register indicating detection of certain malfunctions and to advance said timers if no malfunction is detected.

57. The diagnostic apparatus of claim 54 wherein said microprocessor means further stores and saves transitions in certain of said bits as status indicators.

58. The diagnostic apparatus of claim 55 wherein said microprocessor means is further responsive to an indication of character reception to receive a character.

59. The diagnostic apparatus of claim 56 wherein said microprocessor means further responds to detection of a malfunction to construct a message for transfer out of said microprocessor.

60. The diagnostic apparatus of claim 57 wherein said message indicates the type and location of a malfunction.

61. In a data communication system, including first and second modems, a first communication line, a second communication line, and means for alternately switching the communication path of said first and second modems between said first line and second line, the apparatus comprising:
means for holding said second line while a switch to said first line is made;
means for automatically ascertaining the performance of said first line once said first line has been switched to; and
means for automatically switching back to said second line if said performance is not satisfactory.

62. The apparatus of claim 61 wherein said second line is a back-up line.

63. The apparatus of claim 61 wherein said second line is a dial back-up line and said first line is a dedicated line.

64. Apparatus for testing and controlling a modem comprising:
a control source for providing commands, including test commands to said modem;
means at said modem for receiving said commands;
means at said modem for transmitting messages to said control source;
and means at said modem supplied with said commands by said receiving means for testing said modem in response to said test commands, monitoring the performance of said modem for alarm conditions, and supplying alarm messages to said transmitting means if an alarm condition is detected, said monitoring and supplying being done autonomously of said control source.

65. A data communication system comprising:
a plurality of data modems; a central processor means for generating formatted messages for transmission over selected transmission links; transmission means connecting said modems to said processor; and a test and control unit for use in conjunction with each data modem, each said test and control unit comprising;

means for detecting a plurality of alarm conditions in the operation of its associated modem and setting corresponding alarm bits;

means for receiving a formatted message, including a plurality of words each of which contains an information portion, one of which portions is a command, and for storing the received information portions in a stack;

means for checking the contents of the stack to verify correct receipt of a command and for setting control bits to effectuate a command of said contents are correct;

means for formatting and storing an acknowledgement message in response to detection of an alarm condition by said detecting means or in response to a correctly received command; and means for transmitting a said acknowledgement message out of said test and control unit.

66. Data communication diagnostic apparatus comprising:

a central controller means for providing a plurality of commands over a communication link and for receiving messages over said link;

at least one data modem adapted to communicate with said controller over said link;

means for providing a plurality of signals from which a plurality of alarm conditions may be detected; and means in said data modem including a programmed processor for monitoring said plurality of signals autonomously of said central controller and for detecting from said plurality of signals a plurality of alarm conditions, storing digital indications of the presence or absence of said alarm conditions, and autonomously forming an alarm message for transmission to said central controller upon detection of the presence of a said alarm condition.

67. A communication system comprising:

a data modem adapted to be switched between back-up and primary transmission lines;

a central controller means for communicating commands over either of said transmission lines to said modem, said commands including a first command to switch said data modem from a back-up line to a primary line; and means at said data modem responsive to said first command, for timing an interval during which a second command is expected to be received from said central controller, and for switching said modem back to said back-up line if said second command is not received during said interval.

68. The apparatus of claim 67 wherein said means at said data modem also transmits an alarm signal to said central controller if said second command is not received during said interval.

69. The apparatus of claim 68 wherein said back-up line is a dial back-up line.

70. A data communication system including:

a plurality of data modems each at a remote site, a data terminal communicating with each remote site modem, at least one central-site modem, a central site processor communicating with said central site modem, said central-site modem and remote-site modems being adapted for communication with one another over a transmission medium; and diagnostic apparatus at each said remote site comprising:

means for providing a first plurality of signals from which malfunctions in said data communication system may be detected;

means supplied with said first plurality of signals for repeatedly testing said signals and responsive to said tests for detecting said malfunctions; and means responsive to detection of a said malfunction for generating a second plurality of signals, each indicative of the occurrence of a said malfunction.

71. The diagnostic apparatus of claim 70 further including means for generating a message including the location of a detected malfunction and transferring said message out of said diagnostic apparatus.

72. The diagnostic apparatus of claim 71 wherein said message further includes the type of detected malfunction.

73. The diagnostic apparatus of claim 71 or claim 72 wherein said message is transferred to other apparatus within said modem.

74. The diagnostic apparatus of claim 71 or claim 72 wherein said message is transmitted through said transmission medium to the central site processor in said data communication system.

* * * * *

UNITED STATES PATENT AND TRADEMARK OFFICE
CERTIFICATE OF CORRECTION

PATENT NO. : 4,385,384

DATED : May 24, 1983

INVENTOR(S) : Arthur H. Rosbury, Judson T. Gilbert, Donald C. O'Connor, Grant A. Newland It is certified that error appears in the above—identified patent and that said Letters Patent is hereby corrected as shown below:

Column 4, line 58, delete "system" and substitute --stream--.

Column 16, line 6, delete "when" and substitute --When--.

Column 16, line 8, delete "not" and substitute --no--.

Column 16, line 11, delete "mircoprocessor" and substitute --microprocessor--.

Column 16, line 27, insert --$Y_1$-- before output.

Column 16, line 67, insert a period --.-- after circuit.

Column 16, line 67, delete "this" and substitute --This--.

Column 19, line 8, after site insert --, or its is the digital output of the central site test and control unit.--.

Column 20, line 18, delete "cut" and substitute --out--.

Column 21, line 7, delete "storge" and substitute --storage--.

UNITED STATES PATENT AND TRADEMARK OFFICE
CERTIFICATE OF CORRECTION

PATENT NO. : 4,385,384

DATED : May 24, 1983

INVENTOR(S) : Arthur H. Rosbury, Judson T. Gilbert, Donald C. O'Connor, Grant A. Newland.

It is certified that error appears in the above—identified patent and that said Letters Patent is hereby corrected as shown below:

Column 23, line 32, delete "SPP" and substitute --SPF--.

Column 23, line 38, delete "is" and substitute --in--.

Column 24, line 10, after "utilization" delete "and" and substitute --of--.

Column 24, line 13, after "type" delete "of" and substitute --and--.

Signed and Sealed this

Twenty-seventh Day of September 1983

[SEAL]

Attest:

Attesting Officer

GERALD J. MOSSINGHOFF

Commissioner of Patents and Trademarks